(12) United States Patent
Grundstrom

(10) Patent No.: US 10,515,536 B2
(45) Date of Patent: Dec. 24, 2019

(54) ACTIVE ALERT SYSTEM

(71) Applicant: Hedge Tactical Solutions, Hudson, WI (US)

(72) Inventor: Kevin Lee Grundstrom, Hudwon, WI (US)

(73) Assignee: Hedge Tactical Solutions, Hudson, WI (US)

( * ) Notice: Subject to any disclaimer, the term of this patent is extended or adjusted under 35 U.S.C. 154(b) by 0 days.

(21) Appl. No.: 16/135,650

(22) Filed: Sep. 19, 2018

(65) Prior Publication Data
US 2019/0088106 A1    Mar. 21, 2019

Related U.S. Application Data

(60) Provisional application No. 62/560,450, filed on Sep. 19, 2017.

(51) Int. Cl.
*G08B 25/00* (2006.01)
*H04W 4/33* (2018.01)
*H04W 4/021* (2018.01)
*H04W 4/90* (2018.01)

(52) U.S. Cl.
CPC .......... *G08B 25/008* (2013.01); *H04W 4/021* (2013.01); *H04W 4/33* (2018.02); *H04W 4/90* (2018.02)

(58) Field of Classification Search
CPC ....... H04W 4/021; H04W 4/90; H04W 4/023; H04W 4/02; H04W 4/025; H04W 4/14; G08B 25/008
See application file for complete search history.

(56) References Cited

U.S. PATENT DOCUMENTS

| 2016/0067547 A1* | 3/2016 | Anthony | G01P 15/0891 702/141 |
| 2017/0027529 A1* | 2/2017 | Frieder | G06F 16/9535 |
| 2018/0190040 A1* | 7/2018 | Batten | G06Q 20/085 |

* cited by examiner

*Primary Examiner* — Diane D Mizrahi
(74) *Attorney, Agent, or Firm* — Vidas Arrett & Steinkraus P.A.

(57) ABSTRACT

The invention provides a method and system for providing an active alert. A database with a plurality of mobile phone numbers and/or IP addresses associated with a property address is provided. A server associated with the database is provided. The database stores a geofence associated with the property address, and the database stores urls and location information with a plurality of cameras associated with the property address. Each mobile phone number is associated with a mobile phone, the mobile phone being a smartphone with GPS, wifi and Bluetooth capability. Each smartphone has an active alert app which is installed on the plurality of smartphones, the active alert application having a plurality of buttons, each button associated with a different threat condition, which when pressed by a first user is operatively connected to a dispatch center, the dispatch center accessing the database and the plurality of cameras associated with the property address to assess the selected threat condition, and if the selected threat is verified sending a threat notification to a predetermined number of smartphones associated with the property address, which are inside the geofence.

29 Claims, 27 Drawing Sheets

US 10,515,536 B2

ACTIVE ALERT SYSTEM

CROSS-REFERENCE TO RELATED APPLICATIONS

This application claims priority to provisional application No. 62/560450 filed Sep. 19, 2017, the entire contents of which are hereby incorporated by reference.

STATEMENT REGARDING FEDERALLY SPONSORED RESEARCH

Not Applicable

FIELD OF THE INVENTION

The invention relates to an alert system and more particularly to a smartphone based app which allows location of various types of threats at a location and sending the location of the threat to other smartphones inside a geofence located at the location, as well as calling first responders.

BACKGROUND OF THE INVENTION

Active shooter situations are becoming increasingly common. What is needed is something which can alert other people in a building that an alert situation exists, and its location, so as many people as possible can move away from and exit the building without encountering the threat.

BRIEF SUMMARY OF THE INVENTION

The invention provides a method and system for providing an active alert. A database with a plurality of mobile phone numbers associated with a property address is provided. A server associated with the database is provided. The database stores a geofence associated with the property address, and the database stores urls and location information with a plurality of cameras associated with the property address. Each mobile phone number is associated with a mobile phone, the mobile phone being a smartphone with GPS, wifi and Bluetooth capability. Each smartphone has an active alert app which is installed on the plurality of smartphones, the active alert application having a plurality of buttons, each button associated with a different threat condition, which when pressed by a first user is operatively connected to a dispatch center, the dispatch center accessing the database and the plurality of cameras associated with the property address to assess the selected threat condition, and if the selected threat is verified sending a threat notification to a predetermined number of smartphones associated with the property address, which are inside the geofence.

The user is given the opportunity to cancel an alert, if a button is pressed in error. If not cancelled, the user is shown a floorplan and can touch to locate the threat. Dispatch taps into the cameras in the building using the urls stored in the database, verifies the threat and if verified, contacts emergency responders and sends out an alert notification to either all smartphones inside the geofence (for an active shooter type threat—RED) or to a subset of smartphones associated with NEEDS ASSISTANCE personnel (YELLOW) or to a subset of smartphones associated with MEDICAL ALERT personnel (BLUE).

If the building has multiple stories, the user can indicate which floor using the smartphone, or the GPS capability of the smartphone can determine elevation, which is stored in the database for each floor, or a location device can be placed near the elevator bank or each stairwell of each floor. The location device can register each smartphone which comes near it, using either near field communication, wifi or Bluetooth, as is well known in the art.

If the invention is being used in a campus type situation, with multiple multi-story buildings, each building has its own address, its own geofence and a floorplan for each floor of each building is stored in the database. In a campus situation, the alert notification could be sent to every cellphone on campus (which has the app installed).

The dispatch center can tap into the camera server and display multiple camera feeds on a large screen to verify and track the threat through the building, updating the location of the threat and sending out alert notifications with the current location of the threat. If non-digital cameras are used, the camera server can digitize the feed and send the digital feed to the dispatch center.

The invention can also be used in a residential setting, with cameras on each floor.

DETAILED DESCRIPTION OF THE INVENTION

Figure 1:
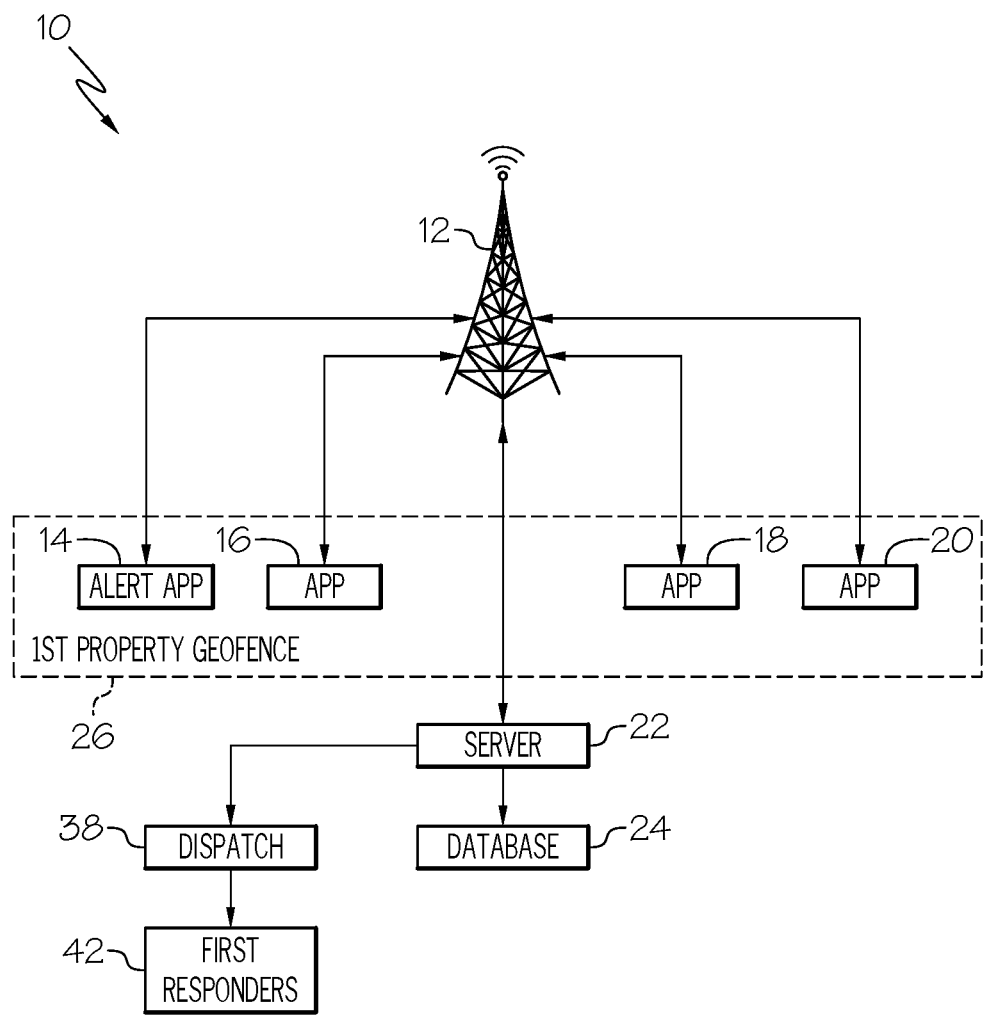
FIG. 1 is a block diagram of the active alert system.

While this invention may be embodied in many forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

FIG. 1 shows a block diagram of the active alert system, shown generally at 10. Reference numeral 12 is the cellular network, which is connected to a plurality of smartphones, a representative number of which are shown at 14, 16, 18 and 20. Each smartphone has GPS, wifi and Bluetooth capability and has an active alert app installed.

The active alert app is operatively connected to a server 22 which is connected to a database 24. The database stores an address associated with a property and a geofence 26 associated with the property, which is shown in dotted line around the smartphones 14, 16, 18 and 20. The database also stores all the mobile phone numbers of the smartphones which have the active alert app installed. The installed app has the geofence information so that the mobilephone knows, using GPS technology, whether it is inside or outside the geofence.

The database also stores information about the mobile phone user, such as whether they are administrative personnel or not. The database could also be easily modified to note whether users are medical personnel or security personnel.

In addition, the database also stores the url's and location of each camera located at the property. The database also stores a floorplan for the property, which can be a single story or multistory building. If multistory, a floorplan is stored for each floor.

Figure 2:
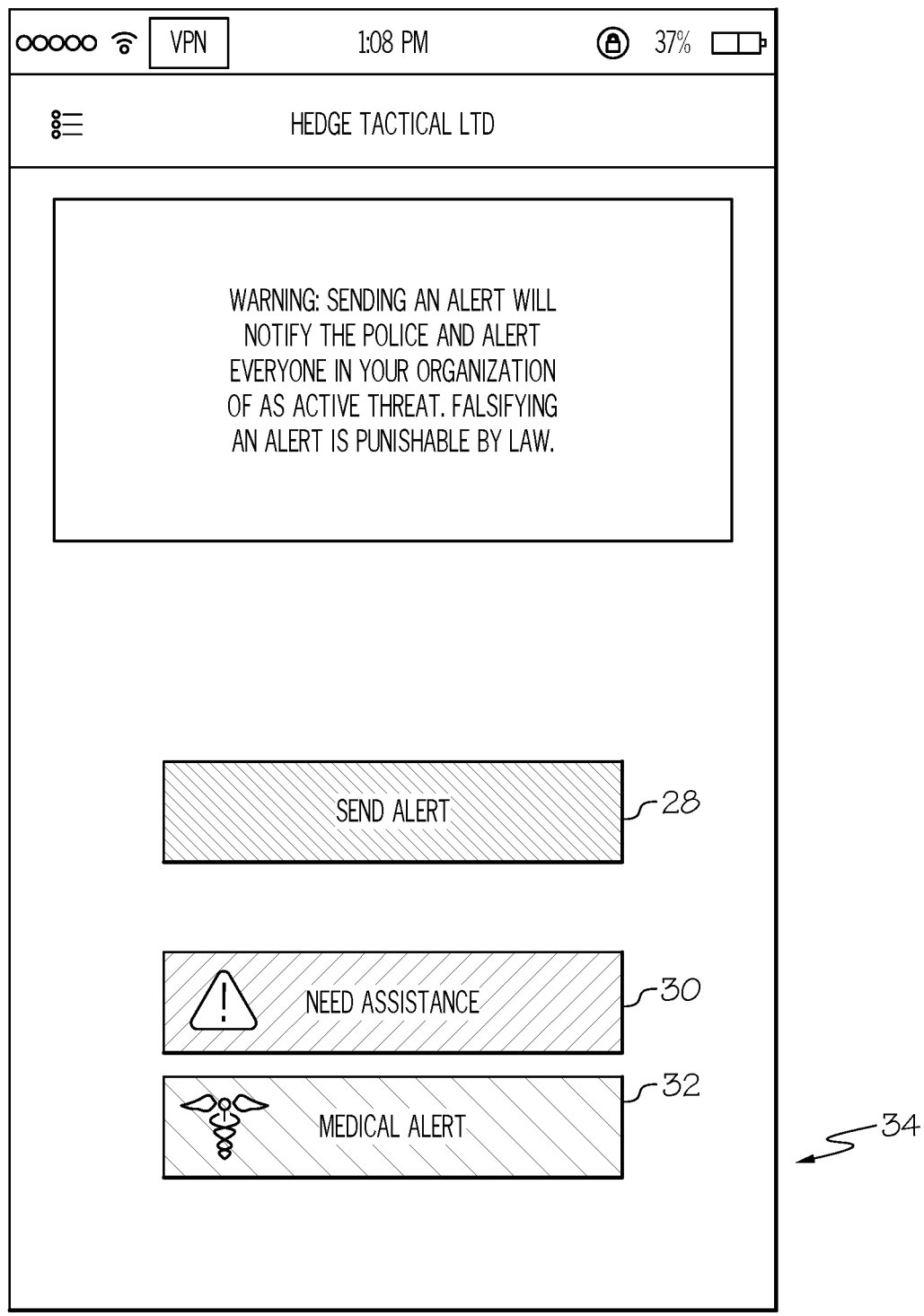
FIG. 2 is a screenshot of a single story version of the app.

The app, best shown in FIG. 2, has buttons associated with different kinds of alerts, such as an alert (red) 28 button, such as an active shooter threat. The app also has a needs assistance (yellow) 30 button, such as an unwanted guest, missing person, confrontation or domestic situation. The app also has a medical alert (blue) 32 button, such as a heart attack, injury, or other medical condition. The app shown in FIG. 2 if configured for a single story building design.

Figure 3:
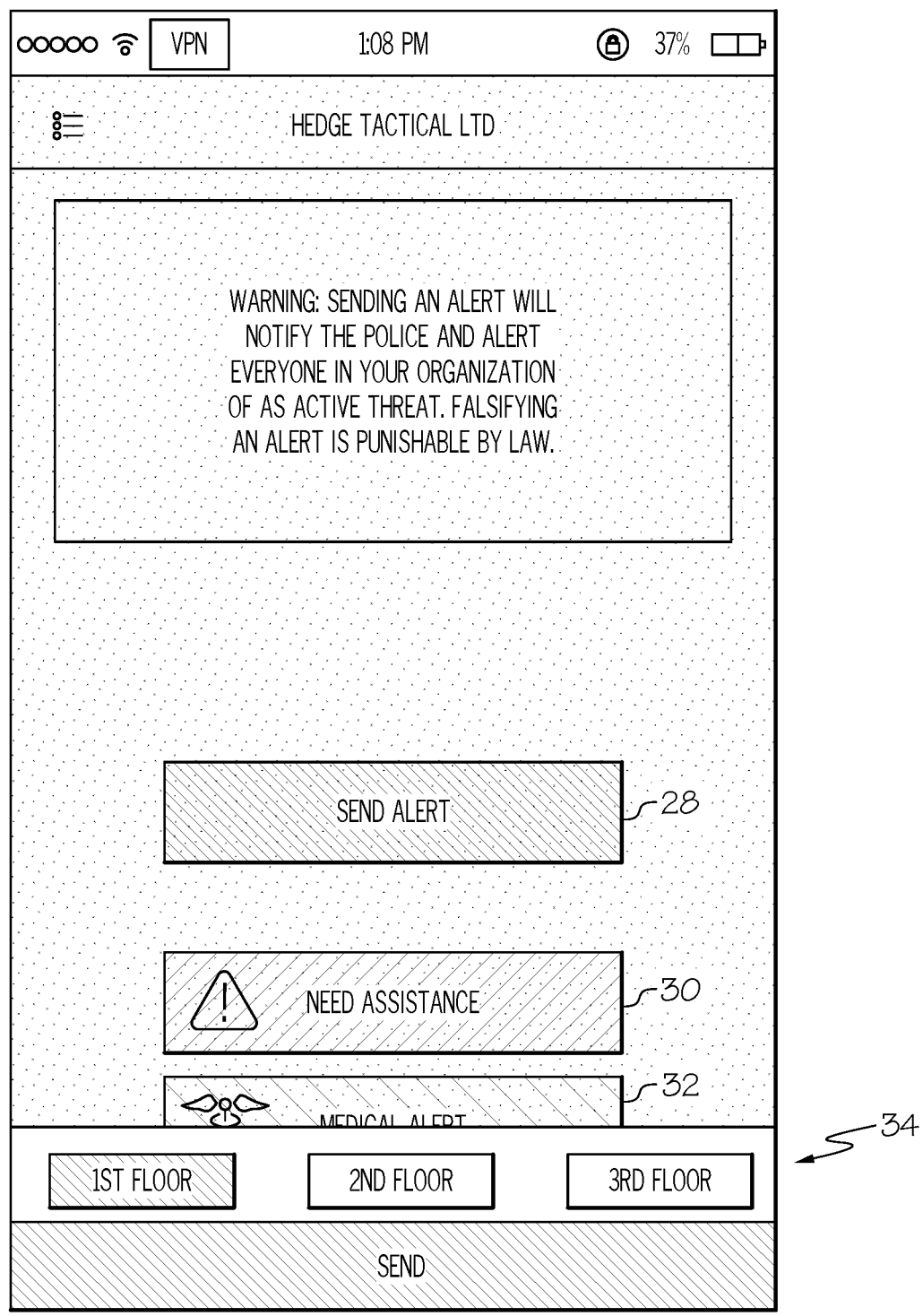
FIG. 3 is a screenshot of a multistory version of the app.

Should the building be a multi-story building, the user would also indicate the floor the alert is present at when sending the alert, shown generally at 34 in FIG. 3.

Server 22 and database 24 can be stored where desired, for example in the cloud.

Figure 4:
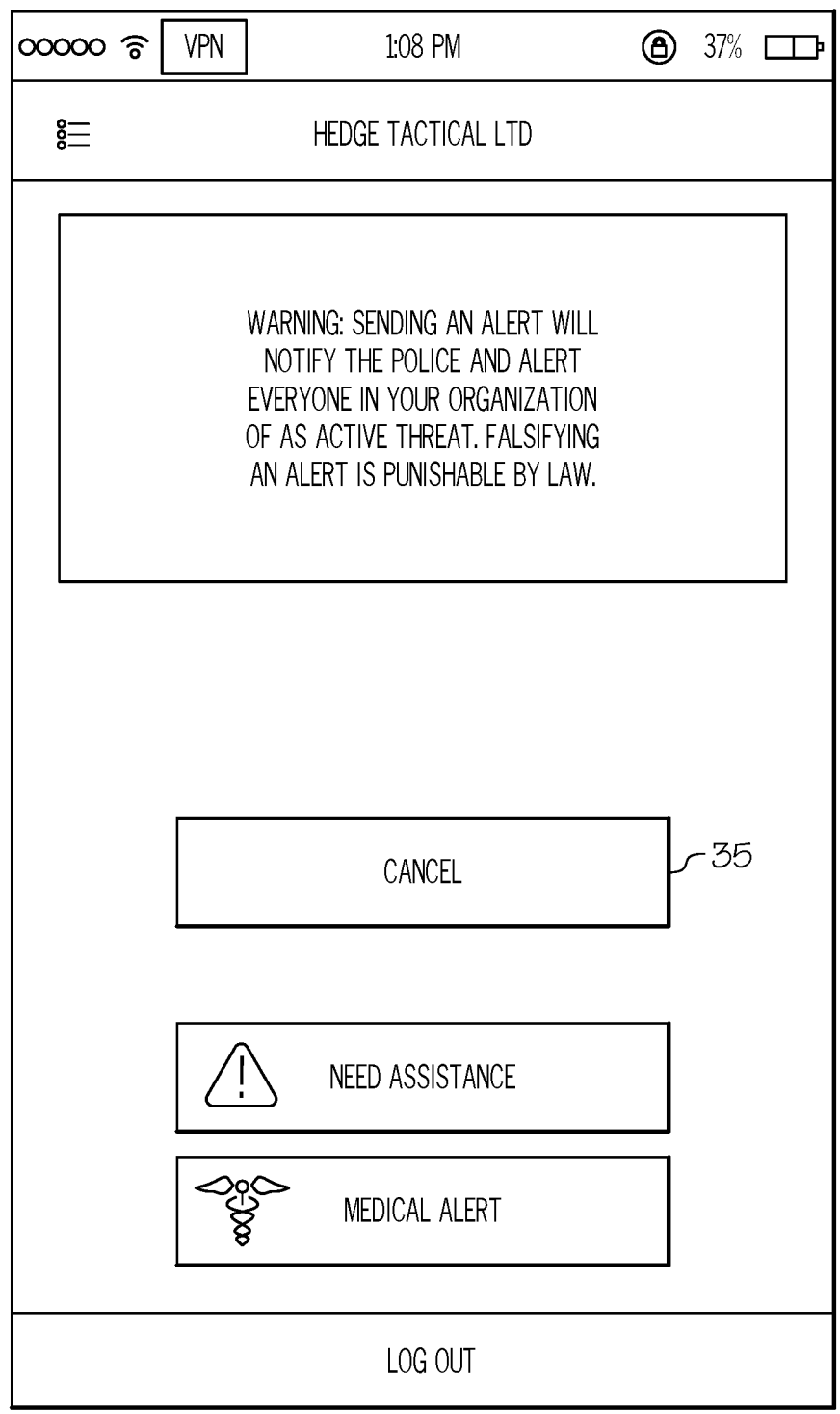
FIG. 4 is a screenshot of a warning screen allowing cancelling of the alert.
Figure 5:
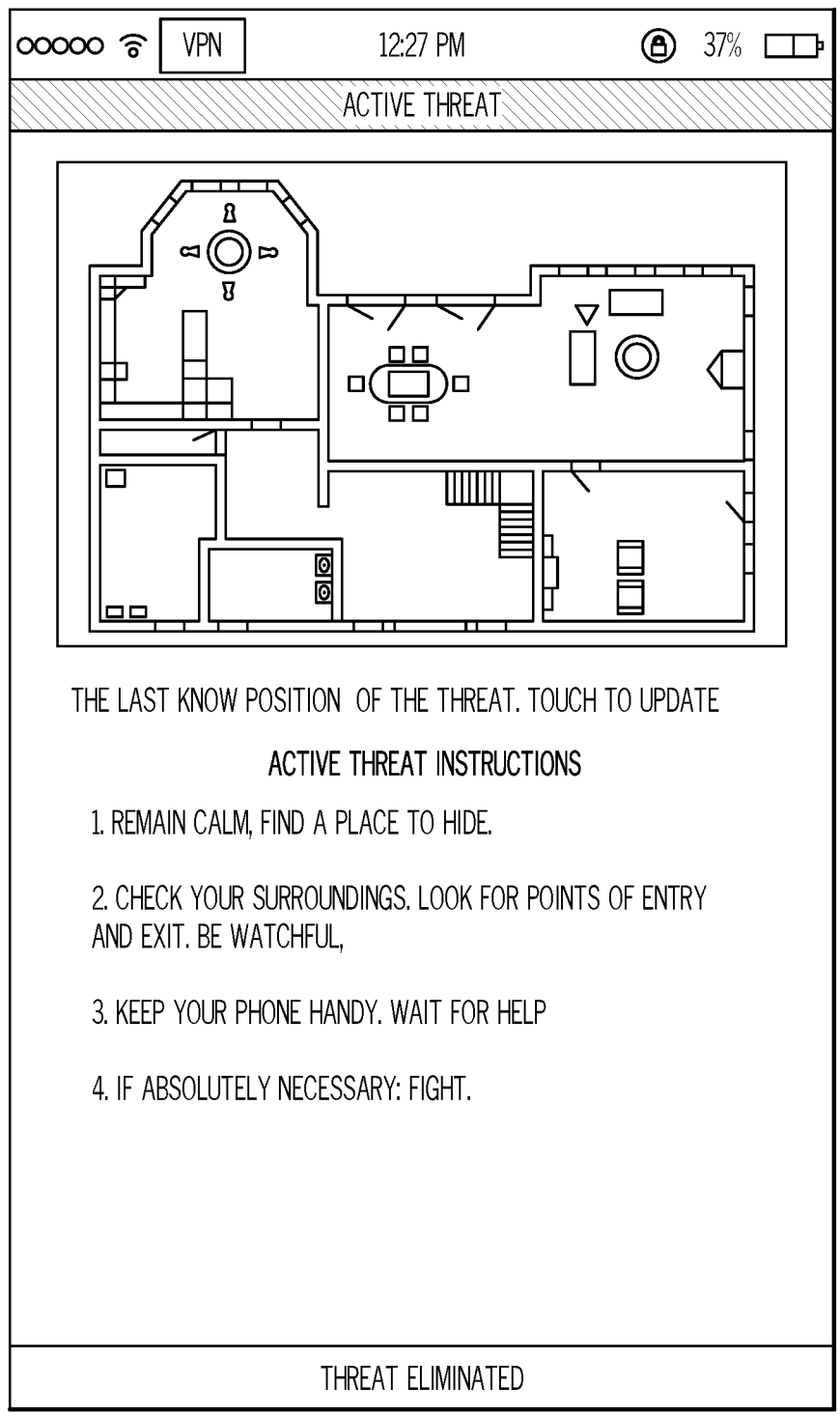
FIG. 5 is a screenshot of the floorplan of the building, inviting the user to touch the screen to locate the active threat.
Figure 6:
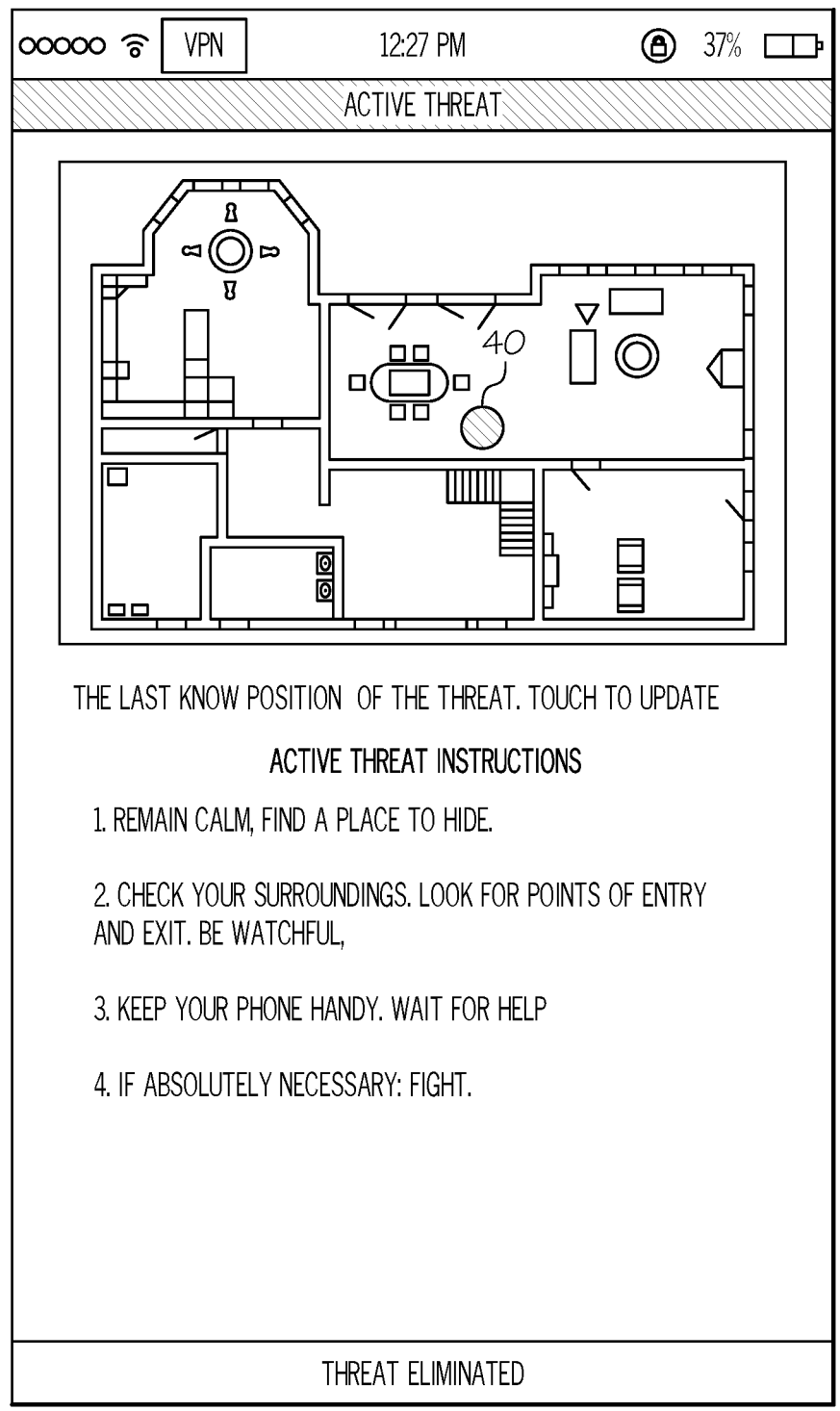
FIG. 6 is a screenshot of the floorplan showing a visual indicator of the location of the active threat.

The app knows whether it is inside the geofence or outside the geofence and the app buttons are enabled only when inside the geofence. When a user pushes the Red alert button 28 of FIG. 2, the dispatch center 38 is sent via push notification, the user location and the user account number, to permit dispatch to locate the property address. The user is shown the screen of FIG. 4, which offers a warning and gives the user a chance to cancel the alert, if the button were pushed by mistake (reference numeral 35). If cancel is not pressed within a predetermined period of time, the screen shown in FIG. 5 is displayed on the user's smartphone. FIG. 5 displays the floorplan of the property and invites the user to touch the screen to locate the threat. If the user touches the screen, the display is updated to that shown in FIG. 6, and a visual indicator 40 is displayed, showing the location of the threat. This screen is sent to dispatch 38, which has access to the cameras, either via url's stored in the database or via a camera server with its IP address being stored in the database.

Figure 7:
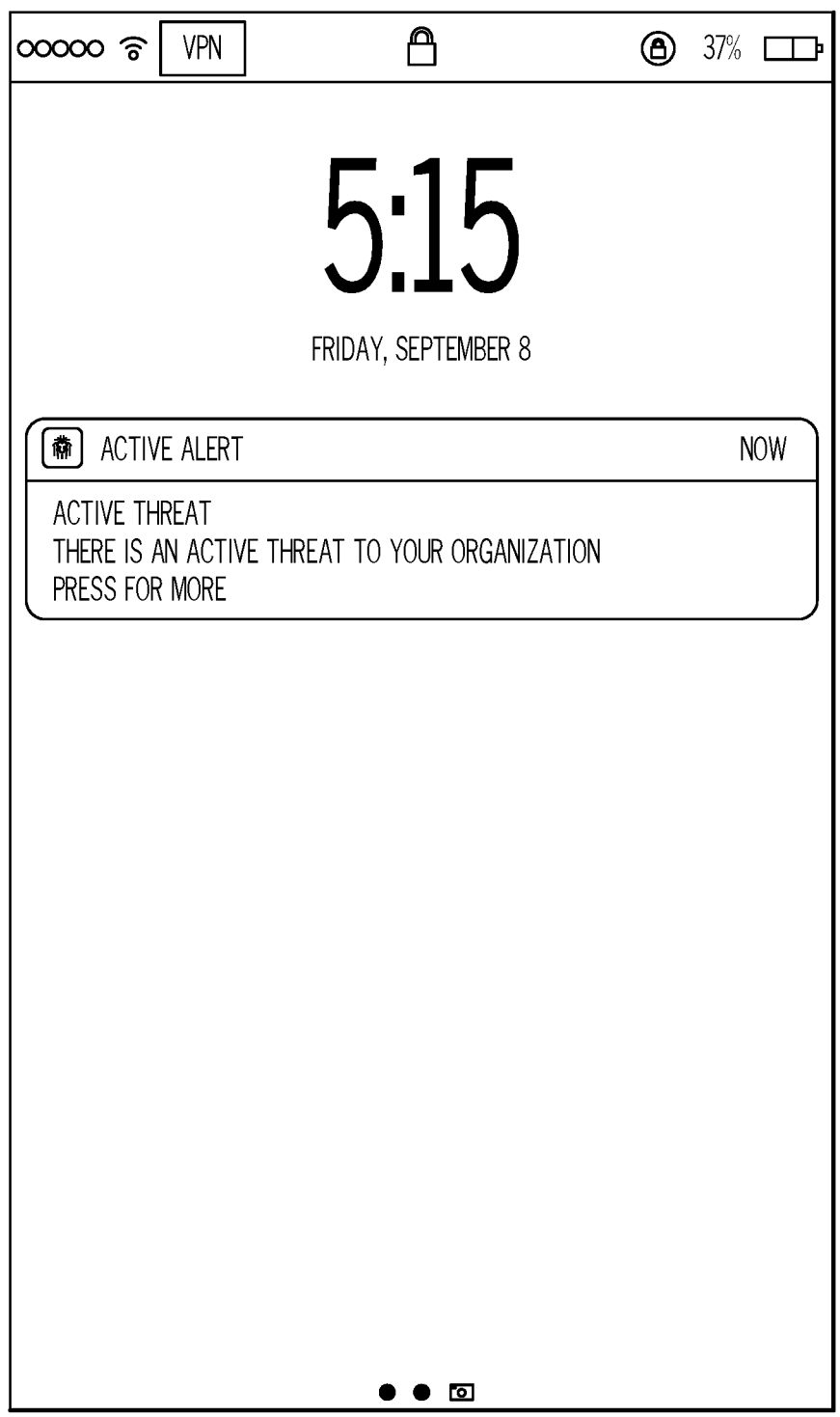
FIG. 7 is a screenshot of the threat notification sent to every smartphone in the geofence.

Dispatch will use the cameras located near the location touched by the user to review and verify the threat. Once the threat is verified, dispatch will send an alert notification to every smartphone, and the phone will determine whether it is inside or outside the geofence and ignore any notifications when it is outside the geofence (see FIG. 7). If a user who gets the alert notification presses for more information they obtain the screenshot showing the location of the active alert, which is updated by dispatch. Dispatch uses the cameras in the building to track the location of the threat and push notifications to every smartphone in the geofence. Dispatch also calls first responders, such as police and 911, once the threat is verified, shown at 42 of FIG. 1. Dispatch 38 has the smartphone numbers of all first responders stored in the database, which are near to the property address, and can feed camera feeds to the first responders. If dispatch 38 determines that the alert is not valid, they can stop the alert and send out a message to that effect to all smartphones the alert message was sent to.

Figure 8:
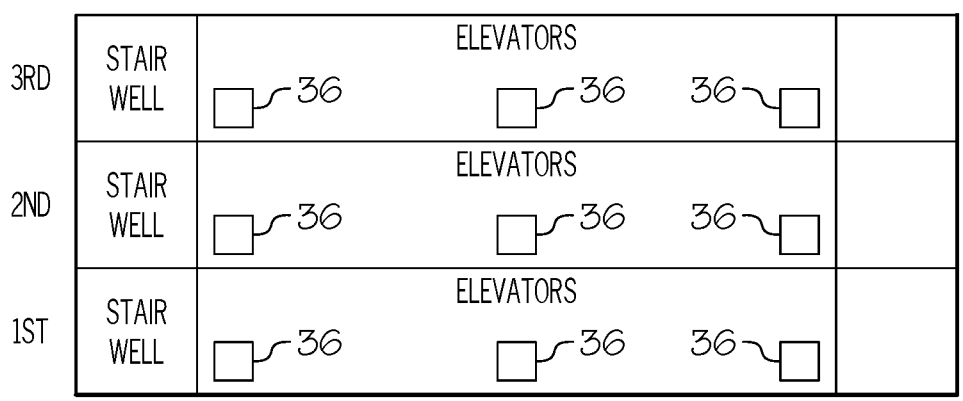
FIG. 8 is a schematic showing location devices located near the elevator bank and by each stairwell on each floor of the building.
Figure 9:
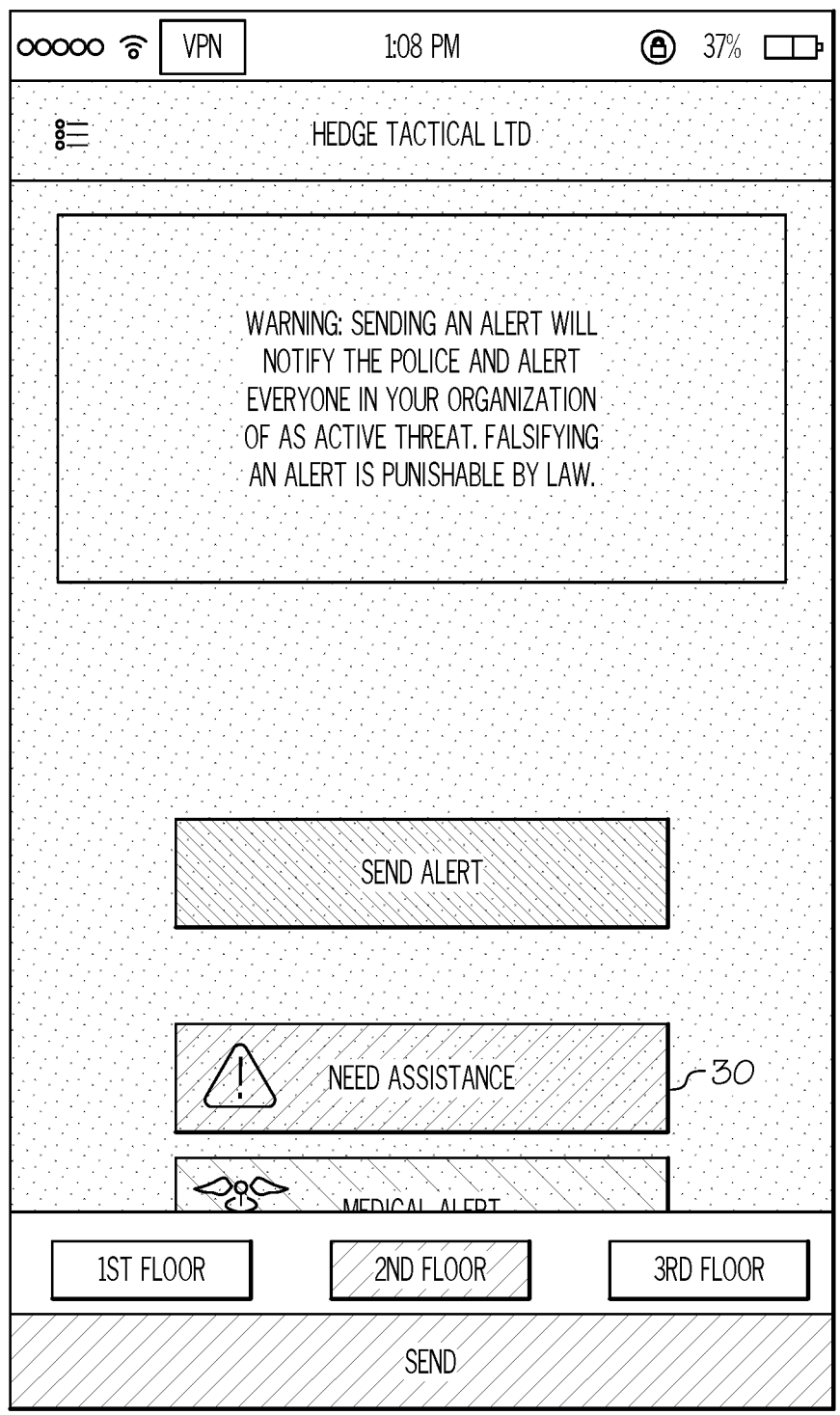
FIG. 9 shows the app screen after the needs assistance yellow button 30 is pressed.

In addition to having buttons 34 so the user can indicate the floor (see FIG. 3), the app could determine the floor by using GPS location to determine elevation and having the elevation of each floor stored in the database. In addition, a location device could be located by each elevator bank and each stairwell, which could register the floor of each mobile phone as the mobile phone comes near the device, as is well known in the art. This can best be seen in FIG. 8, which shows a simplified schematic of a multistory building with a location device 36 located near the elevator bank and each stairwell.

Figure 10:
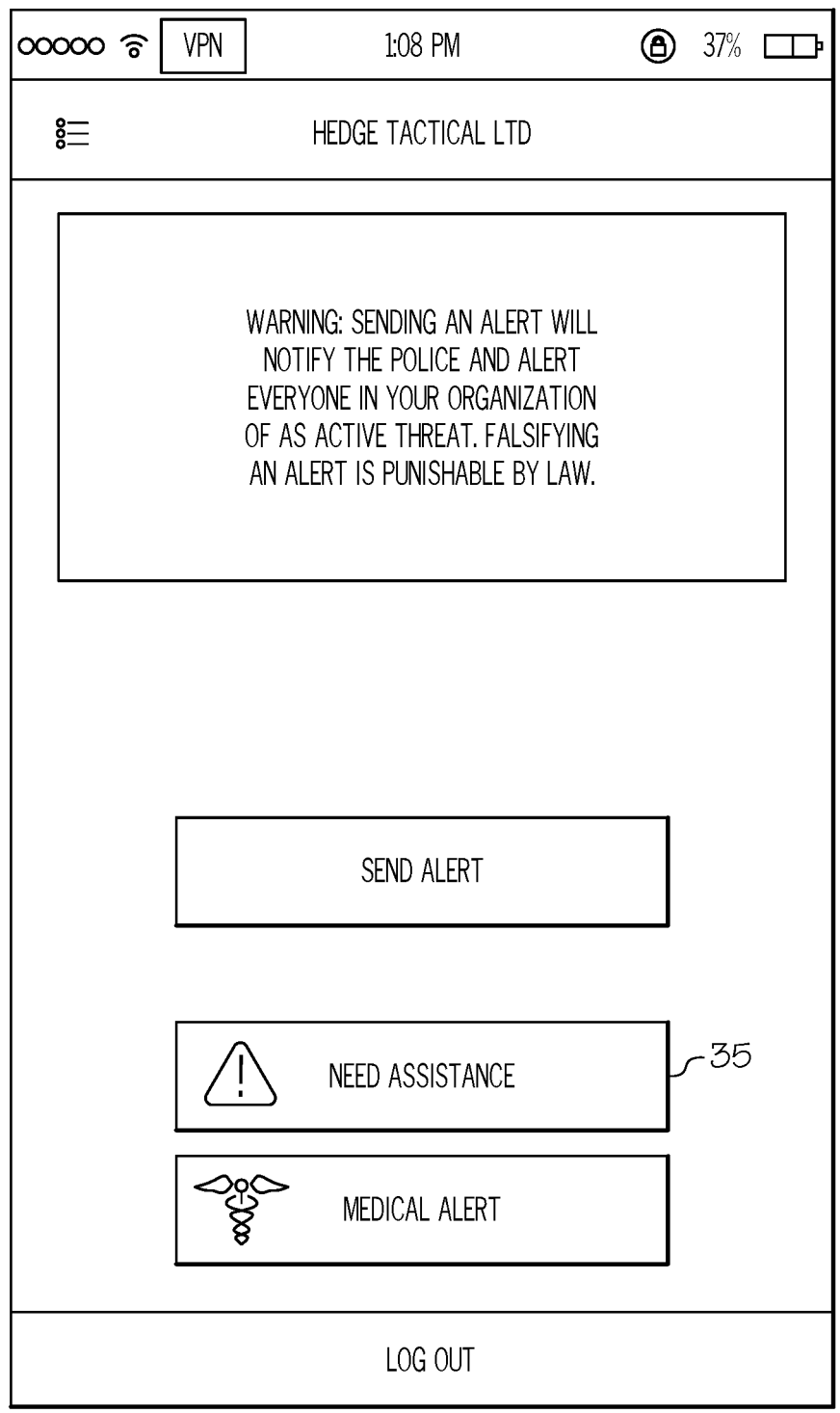
FIG. 10 shows the warning screen.
Figure 11:
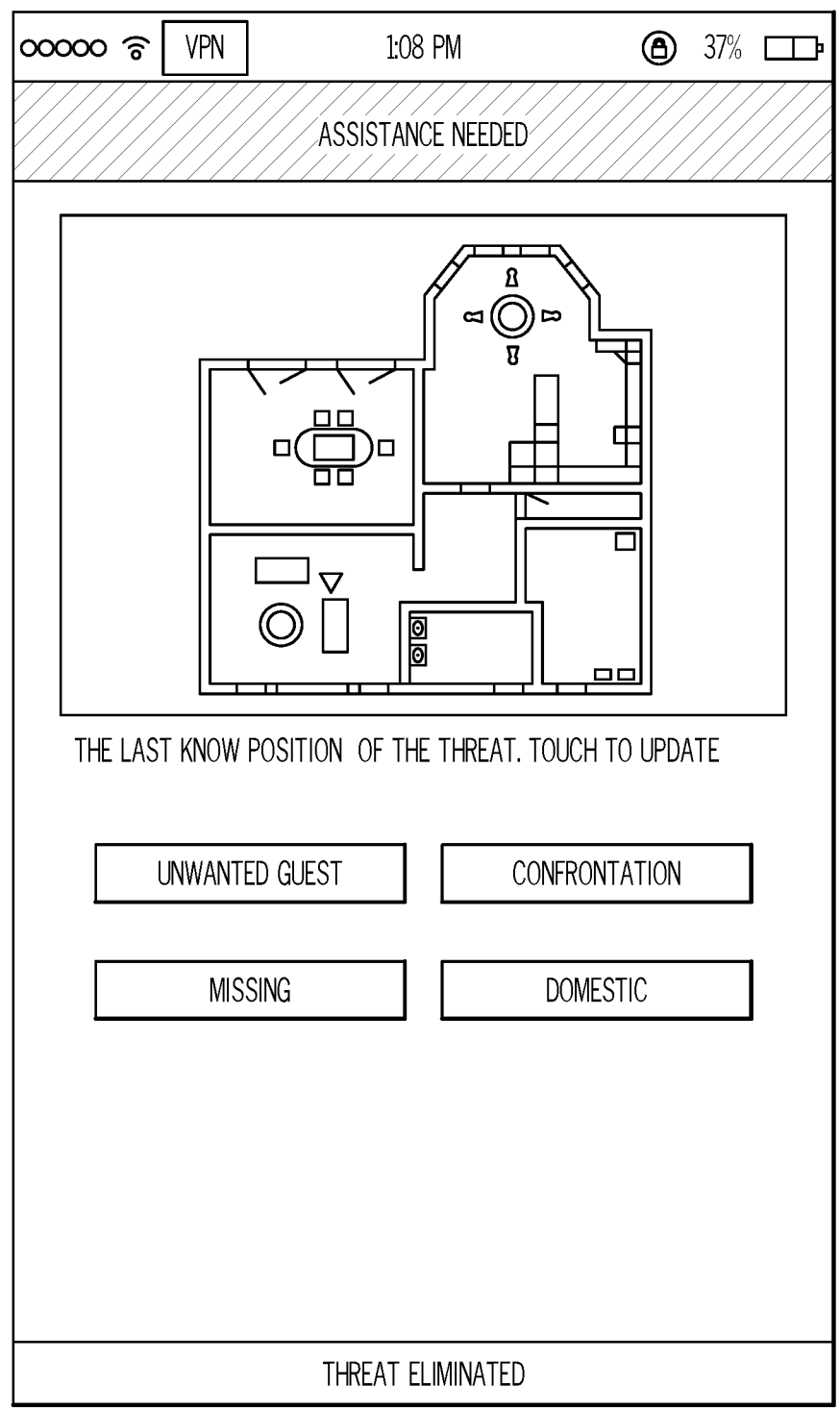
FIG. 11 shows the floorplan prior to the user indicating location.
Figure 12:
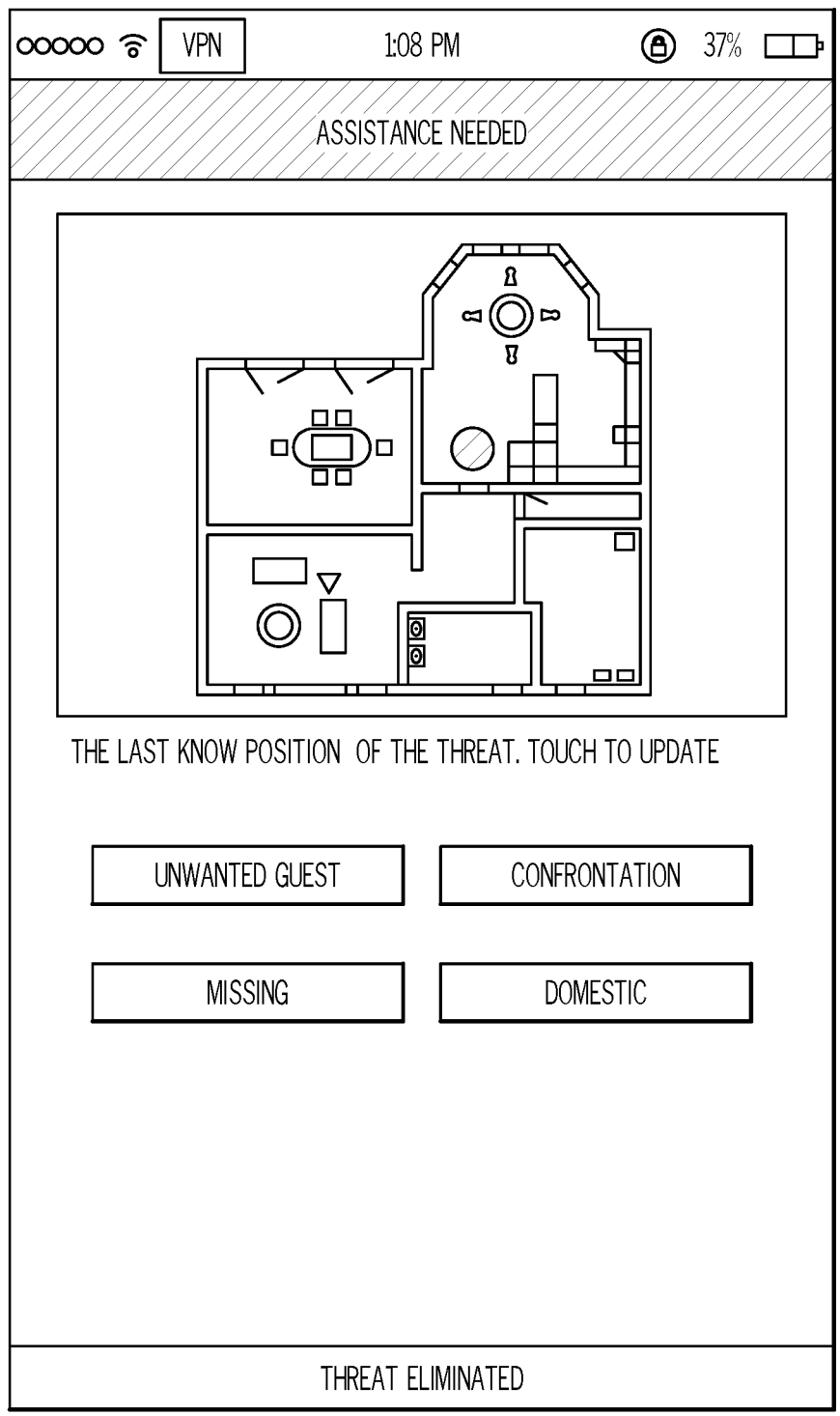
FIG. 12 shows the floorplan after the user has indicated the location of the need.
Figure 13:
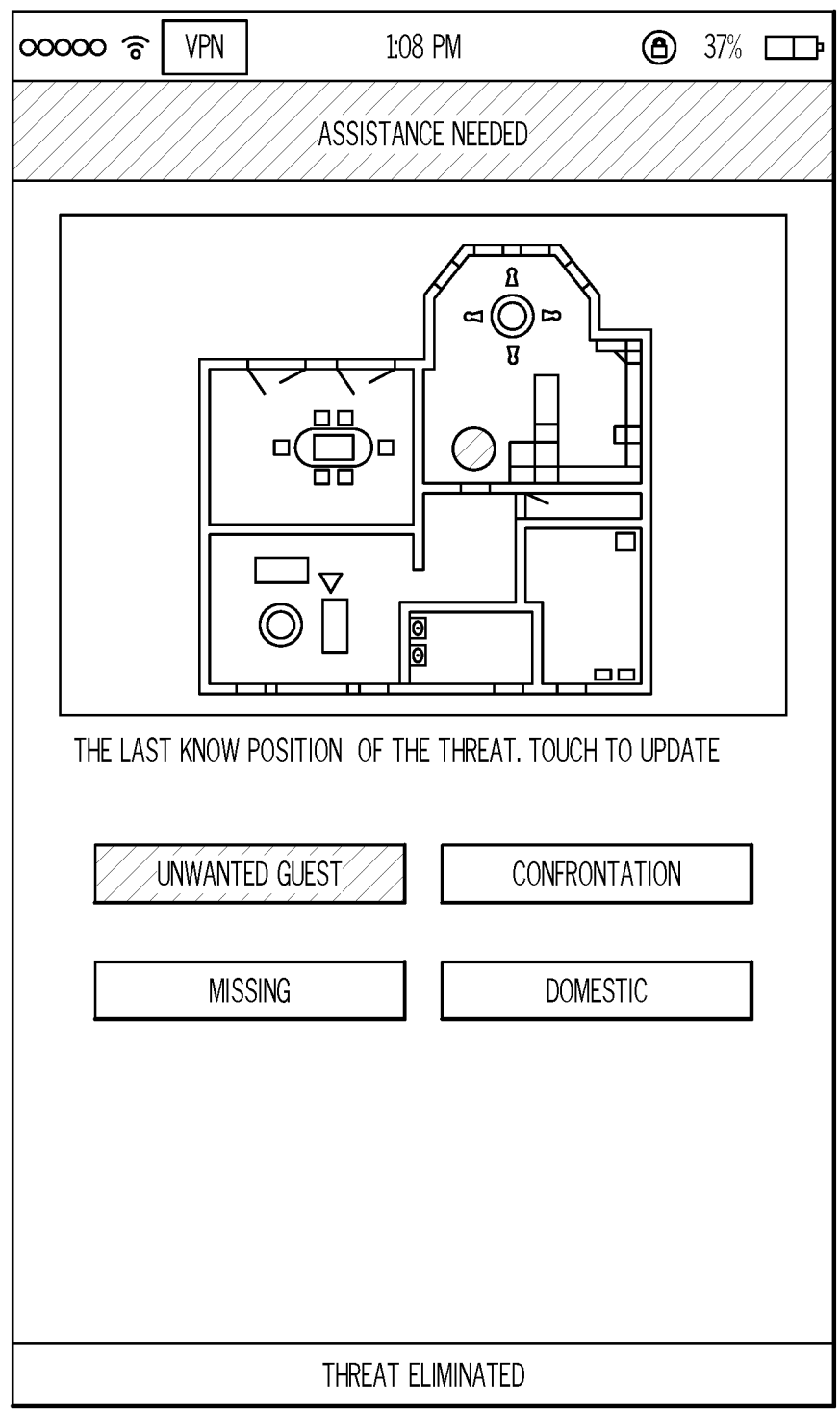
FIG. 13 shows the user indicating the type of need by pressing a button.
Figure 14:
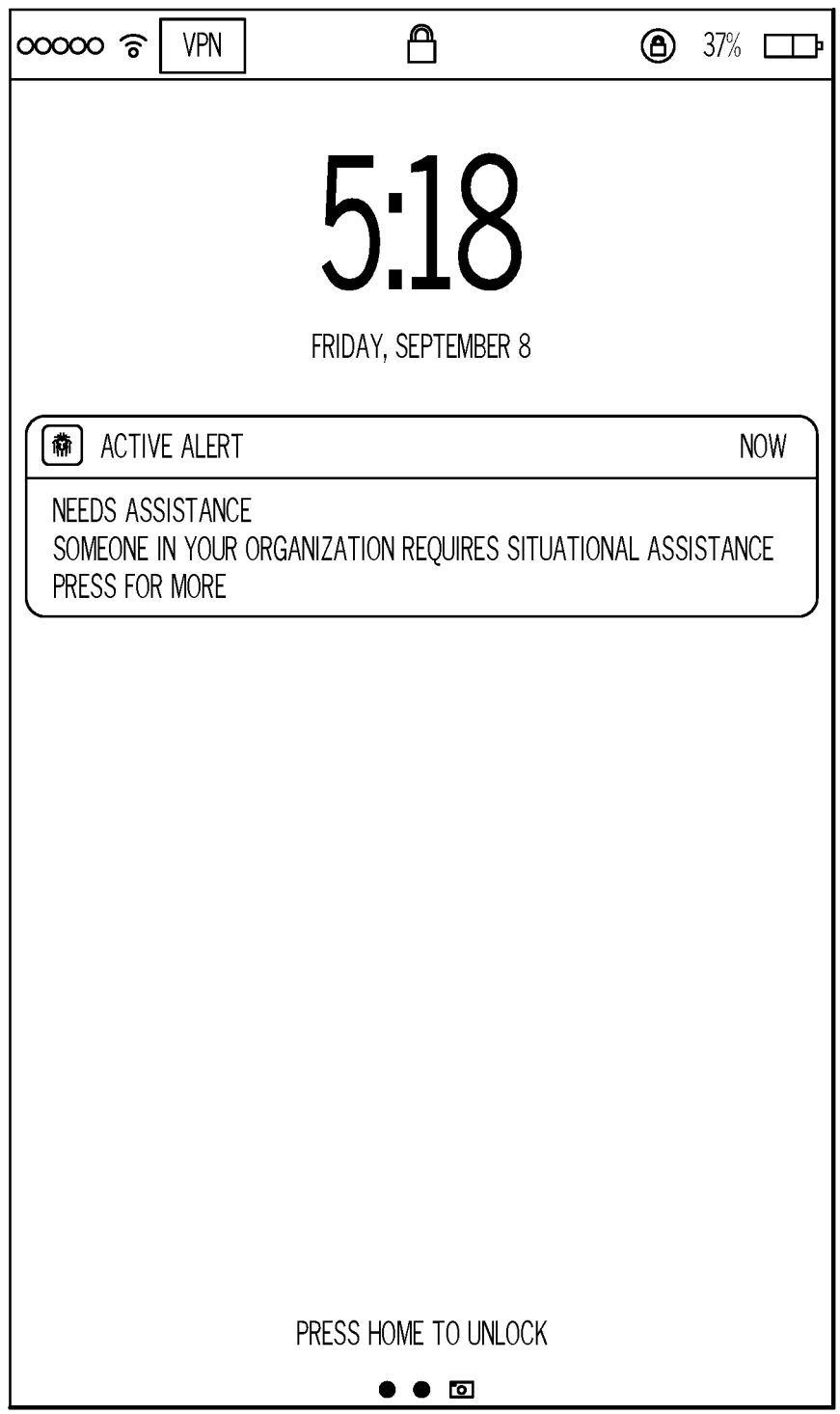
FIG. 14 sows the needs assistance alert notification.

The needs assistance button 30 works similarly, as shown in FIGS. 9-14. The user pushes the needs assistance button at 30 (FIG. 9), and in this version indicates the floor they are on before pushing send, and has a chance to cancel at 35 (FIG. 10). A floorplan is displayed at FIG. 11, and the user is invited to touch to locate where the Needs Assistance is required. Once the user touches the screen, the display is updated as shown in FIG. 12. The user can also select a box to describe the type of needs assistance, as shown in FIG. 13. In the preferred embodiment, needs assistance (and Medical Alert) routes the information to an internal dispatch system, rather than the external dispatch, which is only configured for the threat alert. The internal dispatch system can be an administrator or other designated person who can also access the internal camera system to verify the request. After dispatch 38 determines the validity of the request for needs assistance, a needs assistance active alert is sent to a subset of the smartphones inside the geofence, which are associated with needs assistance alerts, for example administrative personal. In an alternative embodiment of the system, if persons are tagged as onsite security officers they could also be directed to respond to the call. If someone who gets the needs assistance presses the "Pres for more", they are shown the screen of FIG. 12. The admin personal dispatch person may also contact first responders, such as 911, or the person responding to the needs assistance alert may contact first responders, should that be necessary. The first responders can be sent the location information for the needs assistance.

Figure 15:
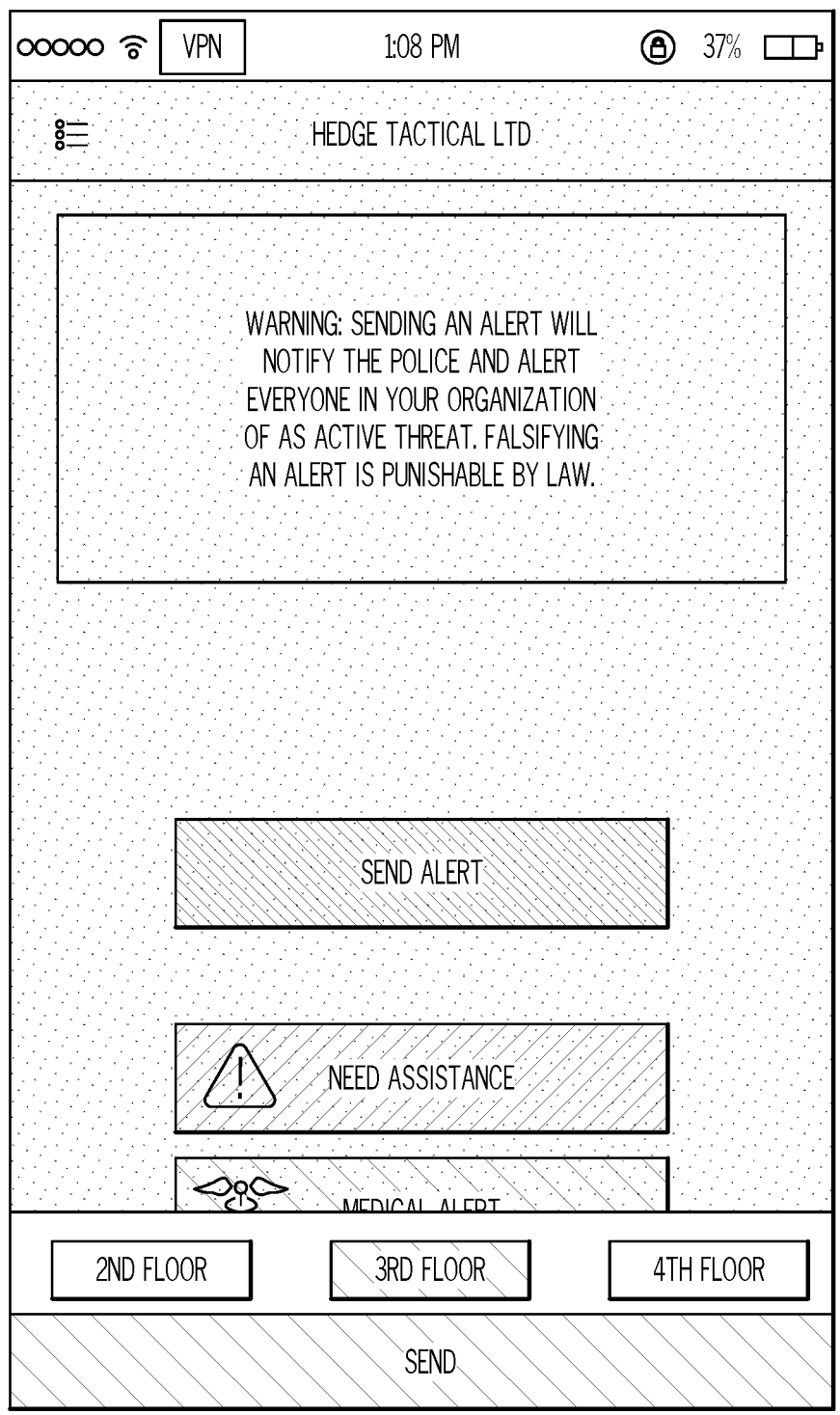
FIG. 15 shows the app screen after the medical alert blue button 32 is pressed.
Figure 16:
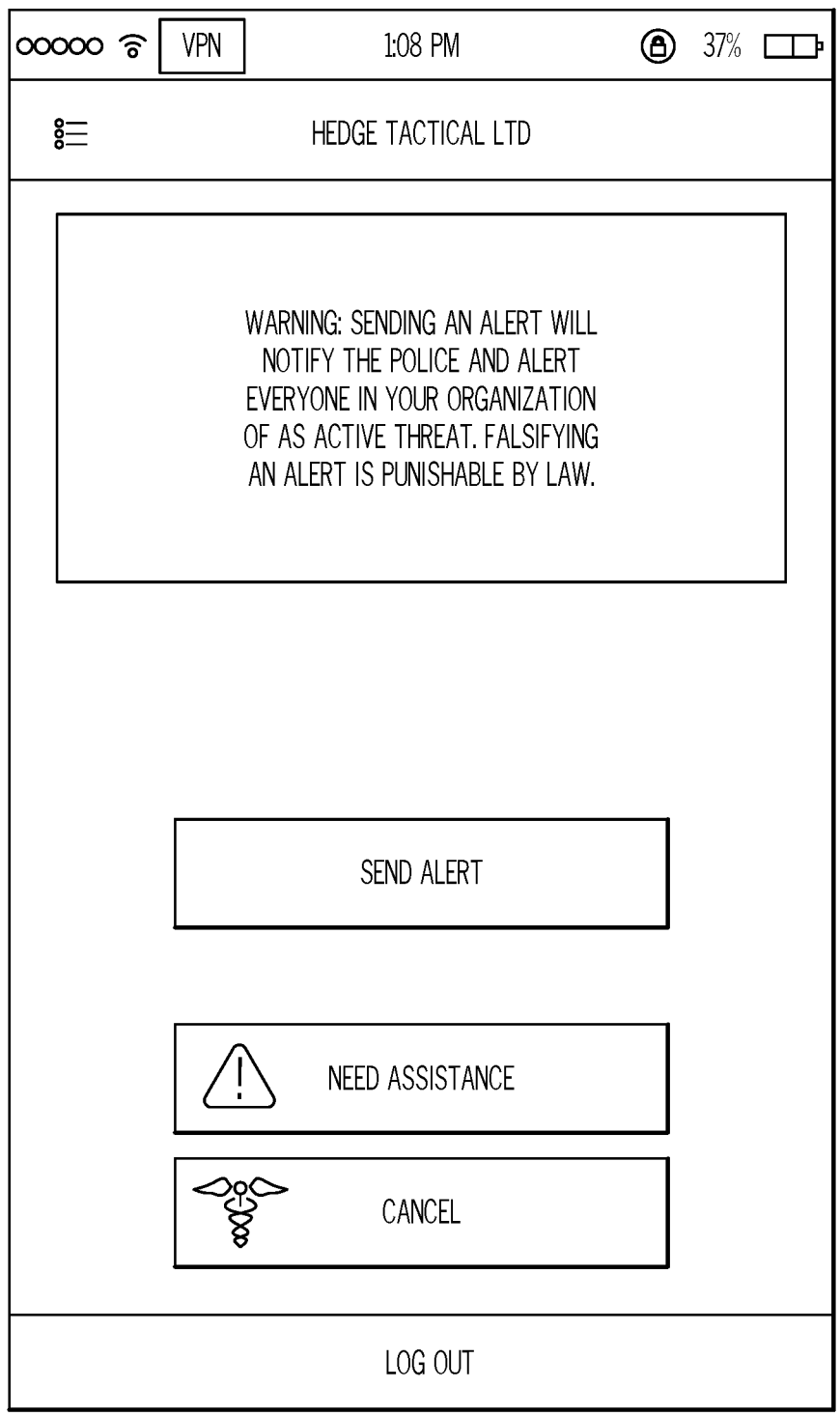
FIG. 16 shows the warning screen.
Figure 17:
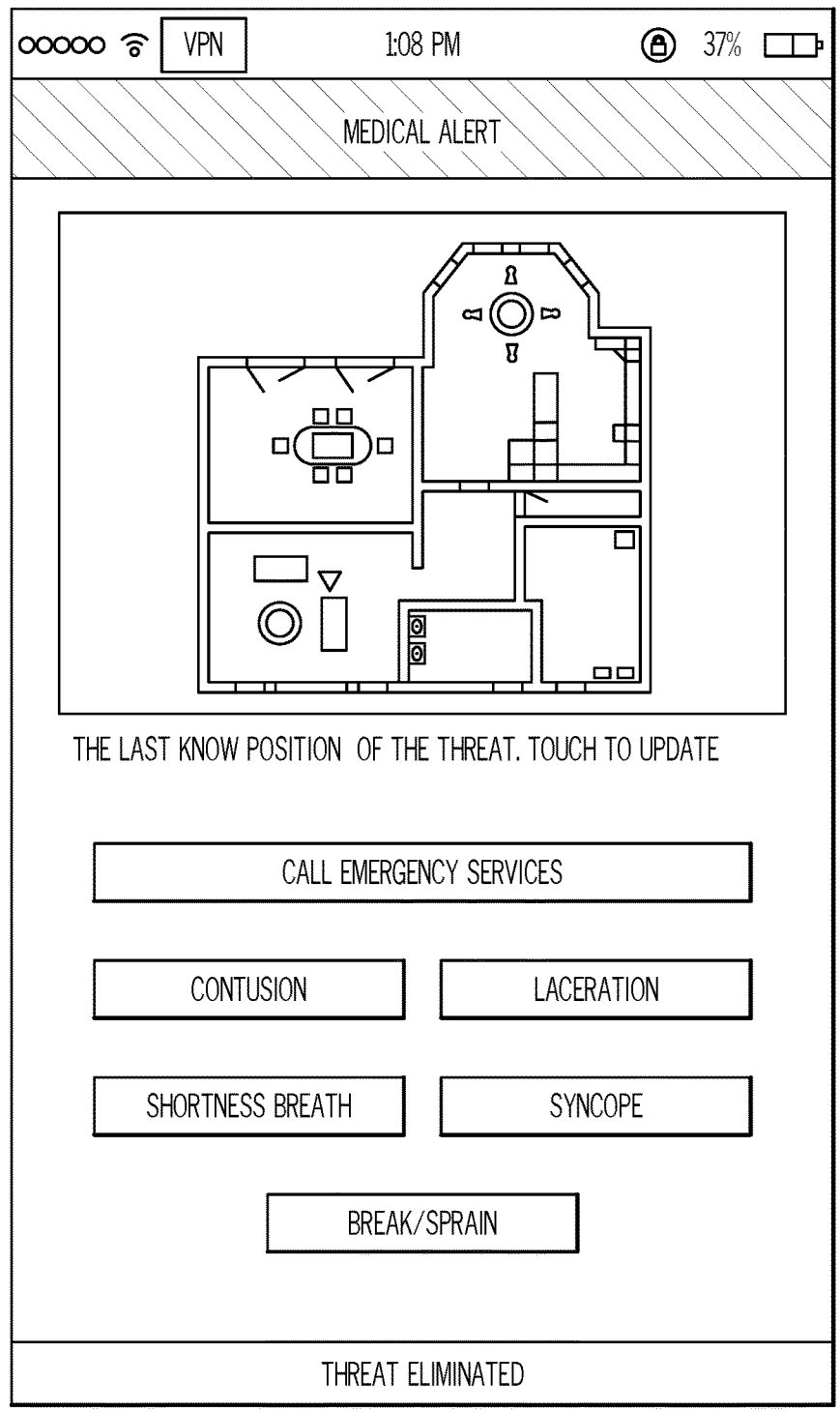
FIG. 17 shows the floorplan prior to the user indicating location.
Figure 18:
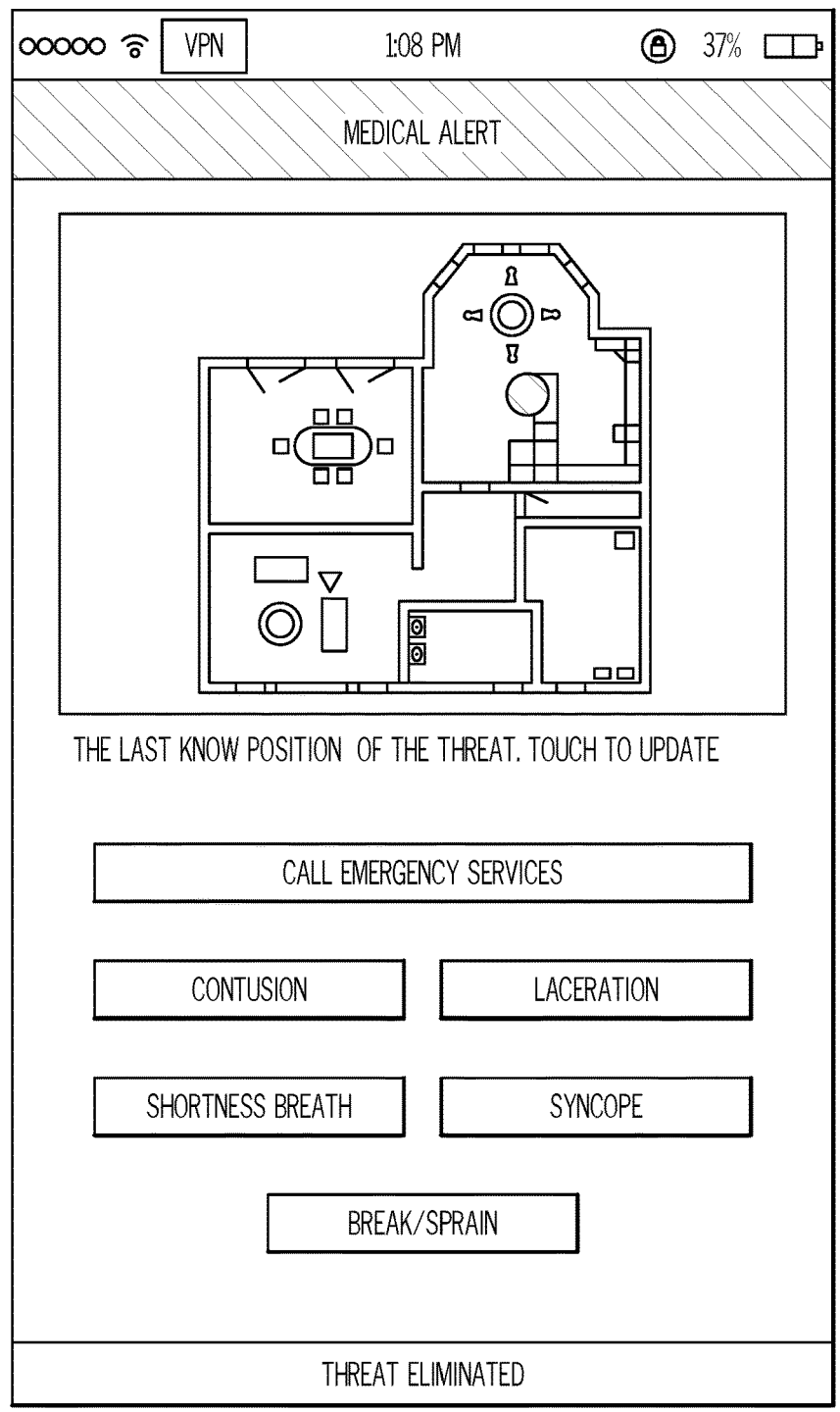
FIG. 18 shows the floorplan after the user has indicated the location of the medical emergency.
Figure 19:
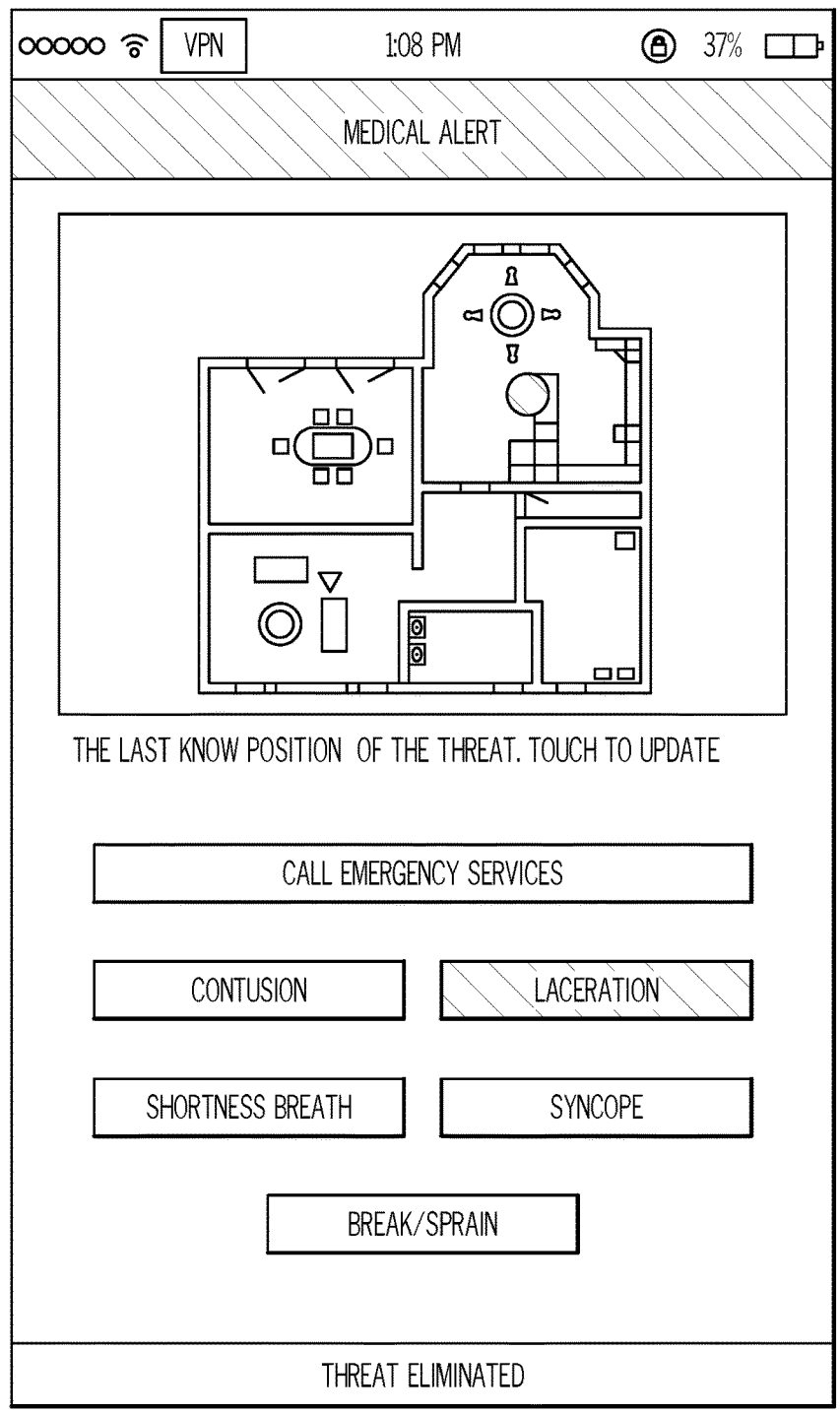
FIG. 19 shows the user indicating the type of medical alert by pressing a button.
Figure 20:
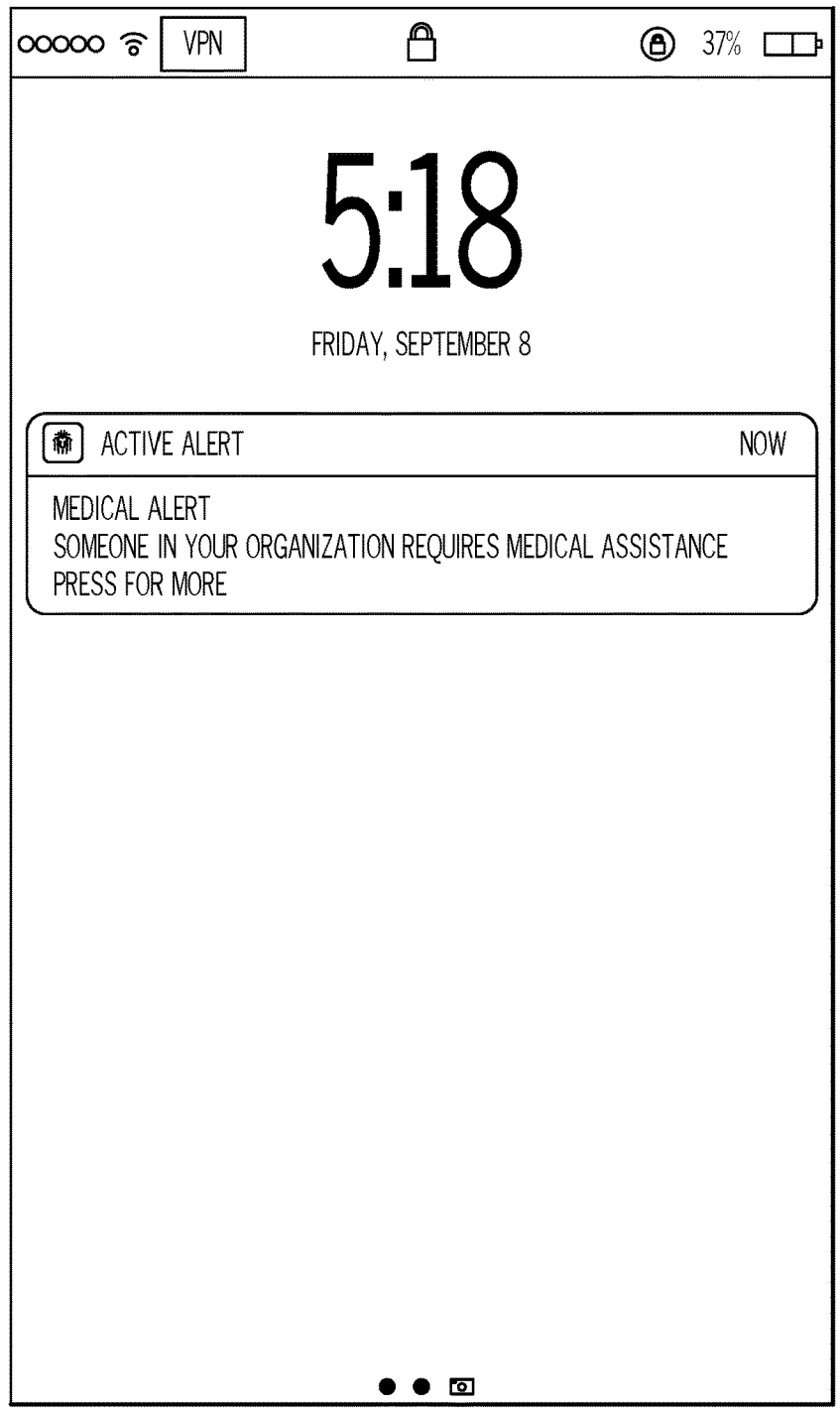

The medical alert button 32 works similarly, as shown in FIGS. 15-20. In FIG. 15, the user pushes the medical alert button and indicates the floor they are on and pushes send. They are given a chance to cancel in FIG. 16. The floorplan is displayed and the user is invited to touch the location of the medical need, as shown in FIG. 17. A blue dot is displayed at the touched location and the user can also select a box to describe the medical need, shown at FIGS. 18 and 19. In the preferred embodiment, needs assistance (and Medical Alert) routes the information to an internal dispatch system, rather than the external dispatch, which is only configured for the threat alert. The internal dispatch system can be an administrator or other designated person who can also access the internal camera system to verify the request. Once dispatch has validated the medical need, a medical alert is sent to the subset of smartphones tagged for medical alerts, inside the geofence. For example, the administrative persons may be notified, or in an alternative embodiment, the school nurse or other medically trained admin person in the building could get the medical alert. The admin personal dispatch person may also contacts first responders, such as 911, or the person responding to the medical alert may contact first responders, should that be necessary. The first responders can be sent the location information for the medical alert.

The database stores user data. AH User data is first created by the mobile sign up process (admins) OR it is created when a use ea' to the application via dynamic linking. The creation code is the same.

In the preferred embodiment, all User data is first stored in Firebase as a JSON tree, and immediately persisted to Cloud Datastore as an Entity. All persistence is handled with Cloud Functions.

The firebase can have the following fields (as well as additional fields should they be desired):

| Firebase Field | Description |
|---|---|
| Email | The user's email address, captured on sign up |
| fcm_token | The Firebase Cloud Messaging token ID created for the user once they 'allow notifications' in app |
| Joined | The human readable DateTime the user was created in the system, in the user's timezone. Example: 04-13-2017 03:04:30 |
| orgId | The auto-created Firebase ID of the organization the user belongs to |
| organizationName | The user's organization as a written name. Example: Apple, Inc |
| phoneNumber | The user's role. Either admin (if granted admin access, or created their org in sign up process), or user (a normal user with no special access privileges) |

The cloud database can have the following fields (as well as additional fields should they be desired):

| Cloud Datastore Field | Description |
|---|---|
| Email | The user's email, copied from firebase value: email |
| user_id | The user's auto-id, created by Firebase. Example: 6jEUo69uzfZV4p8RVFs5h772ol72 |
| joined_readible | The human readable DateTime the user was created in the user's timezone. copied from Firebase value: joined |
| joined_zone_specific | The time the user was created as a timezone independent, ZULU value. Example: 2017-04-10T12:35:21.000Z |
| org_id | The unique ID of the user's organization stored in Firebase. Example: -Kh_ecrzR_H_HuexO3es. This is the root of the JSON structure for all organization values in Firebase, and is linked to a user on user creation |
| user_orgName | The user's organization as a written name. Copied from Firebase value: organizationName |
| user_phone | The user's verified phone number, copied from Firebase value: phoneNumber |
| user_role | The user's role. Either admin or user, copied from the Firebase value: userRole |

The cloud database could also have a table for alerts, to keep track of when an alert was created, when closed, what notification was sent. For each alert, a separate table could keep track of when the alert was initiated, the user who sent it, the address of the org where the active threat alert (or other type of alert) was posted, and a note field could be provided for notes added after the alert, to describe the alert in more detail.

Tables could also be provided for map information, such as below:

| Firebase Field | Description |
|---|---|
| Address | The human readable address of the organization: address, city, state, zip |
| admin | The first admin of the organization (created on sign up as the user who created the organization |
| created | The human readable DateTime the organization was created in the Organization's timezone. Example: 04-13-2017 03:04:30 |
| lat_long | stores lat/long values for location on a global map |
| -lat_long: | latitude Organization Latitude value |
| -lat_long: | longitude Organization Longitude value |
| name | The organization's written name |
| stripe_customer_id | The unique id of the customer stripe creates for the org |

Cloud Datastore Field Description

| | |
|---|---|
| org_address | The human readable address of the organization, copied from firebase value: address |
| org_creator_id | The first admin of the organization, and the creator, stored as an ID. Copied from Firebase value: admin. Example: N1sHxPa9FJNkaAboDnnafEGLot22 |

-continued

| | |
|---|---|
| joined_readible | The human readable DateTime the organization was created in the Organization's timezone. copied from Firebase value: created |
| joined_zone_specific | The time the organization was created as a timezone independent, ZULU value. Example: 2017-04-12T11:55:25.000Z |
| org_id | The unique ID of the organization stored in Firebase. Example: -Kh_ecrzR_H_HuexO3es. This is the root of the JSON structure for all organization values in Firebase |
| org_lat_long | The geopoint value for latitude and longitude for the organization, copied from the Firebase value: lat_long. Example: {"latitude":44.9686012,"longitude":-92.7025417} |
| org_name | The name of the organization, copied from Firebase value: name |
| org_stripe_customer_id | The stripe customer id for the organization, copied from the Firebase value: stripe_customer_id |

Figure 21:
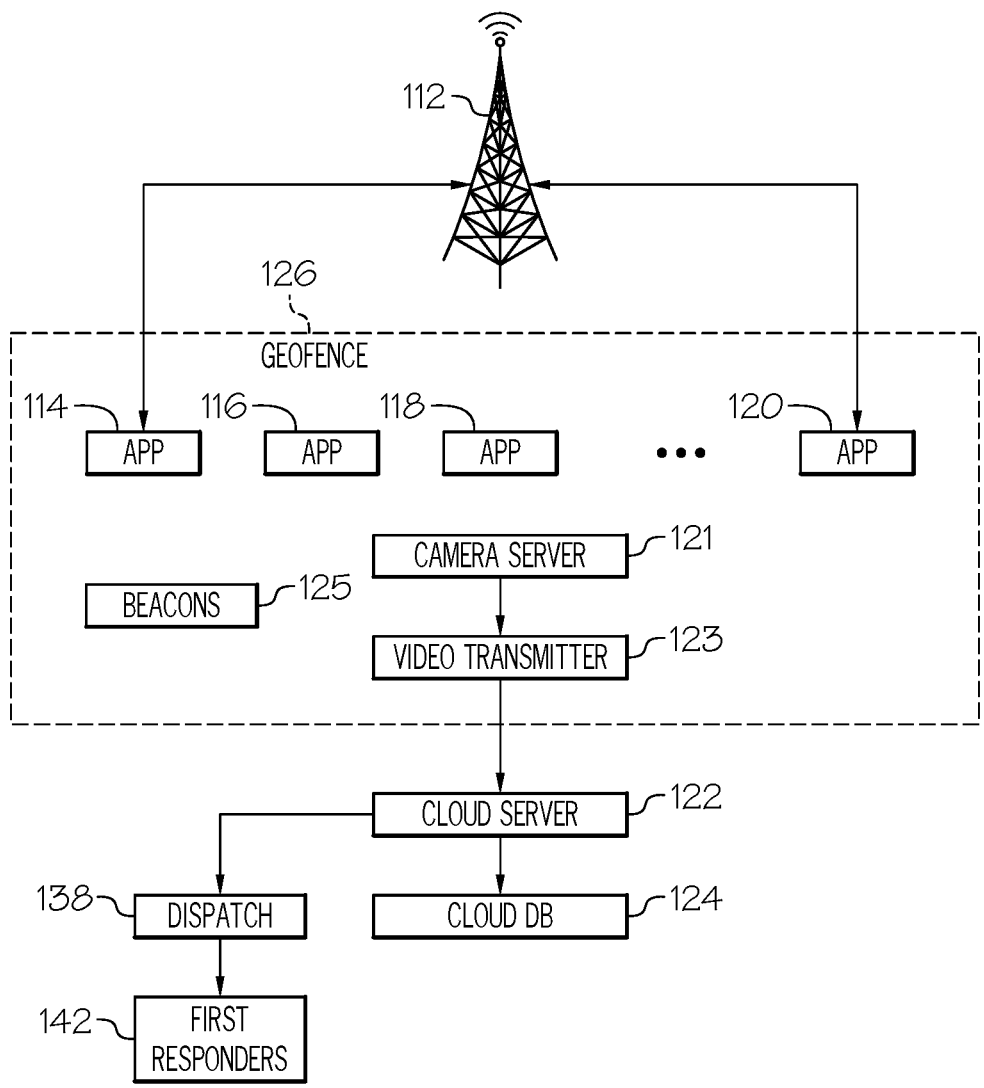
FIG. 21 is a block diagram of another embodiment of the active alert system.

Referring now to FIG. 21, an alternative embodiment of the invention is shown in which the organization has an onsite camera server 121 connected to a video transmitter 123. One suitable video transmitter is the Maverick provided by Acoba, which has 64 ports for IP cameras and which encodes links to each camera and allows connection to the alarm monitoring center (dispatch 138). Each Maverick port is mapped to a camera on a floorplan so dispatch 138 can easily change feed to the desired camera in the building. The building can also be provided with beacons 125 to allow for automatic registration and tracking of Smartphones between floors and rooms. Each IP camera in the building can also be equipped with a microphone to detect sounds (like a firearm shot) and/or a smoke sensor or heat sensor.

Figure 24:
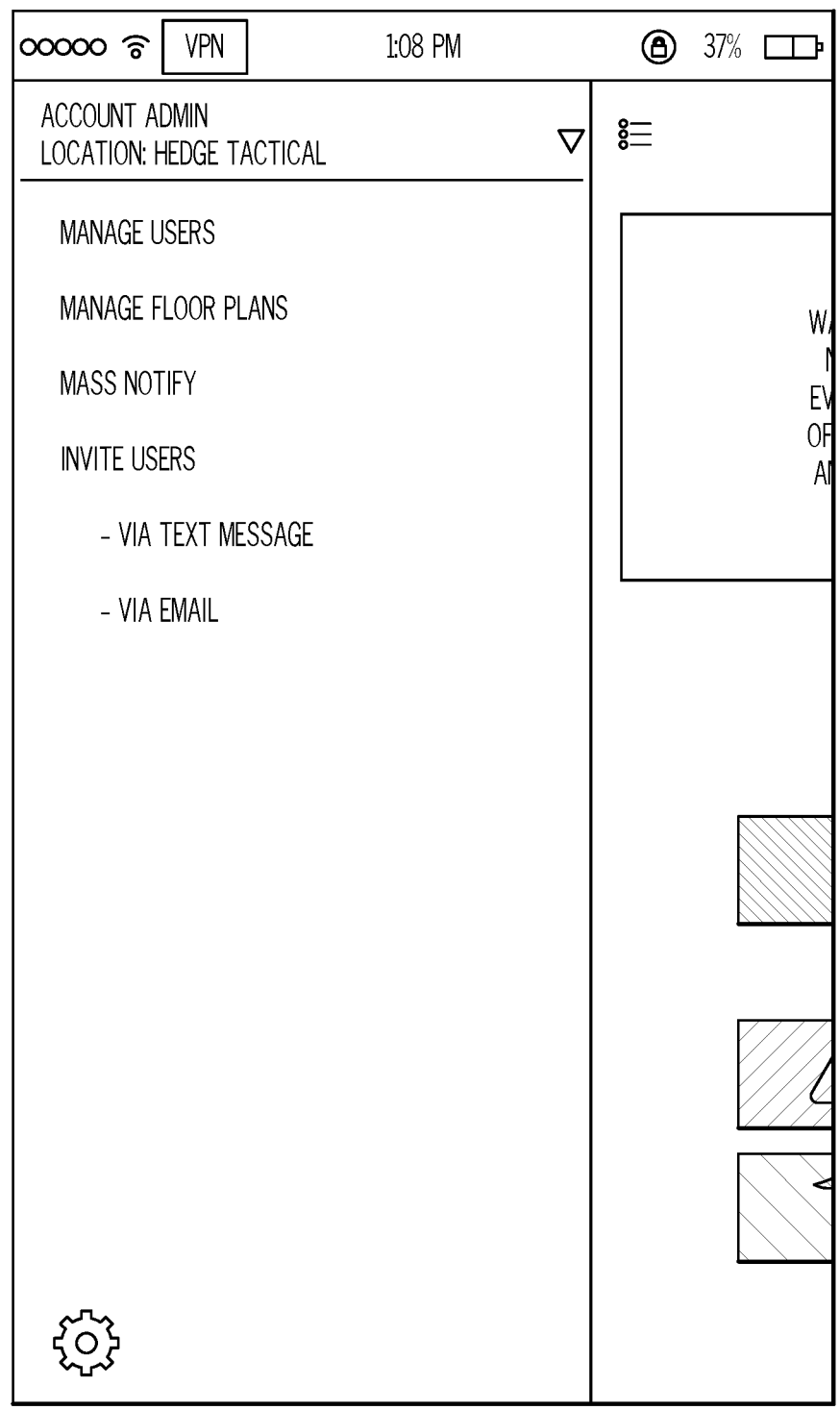
FIG. 24 is a side screen of the admin options of the app for another embodiment of the active alert system.
Figure 25:
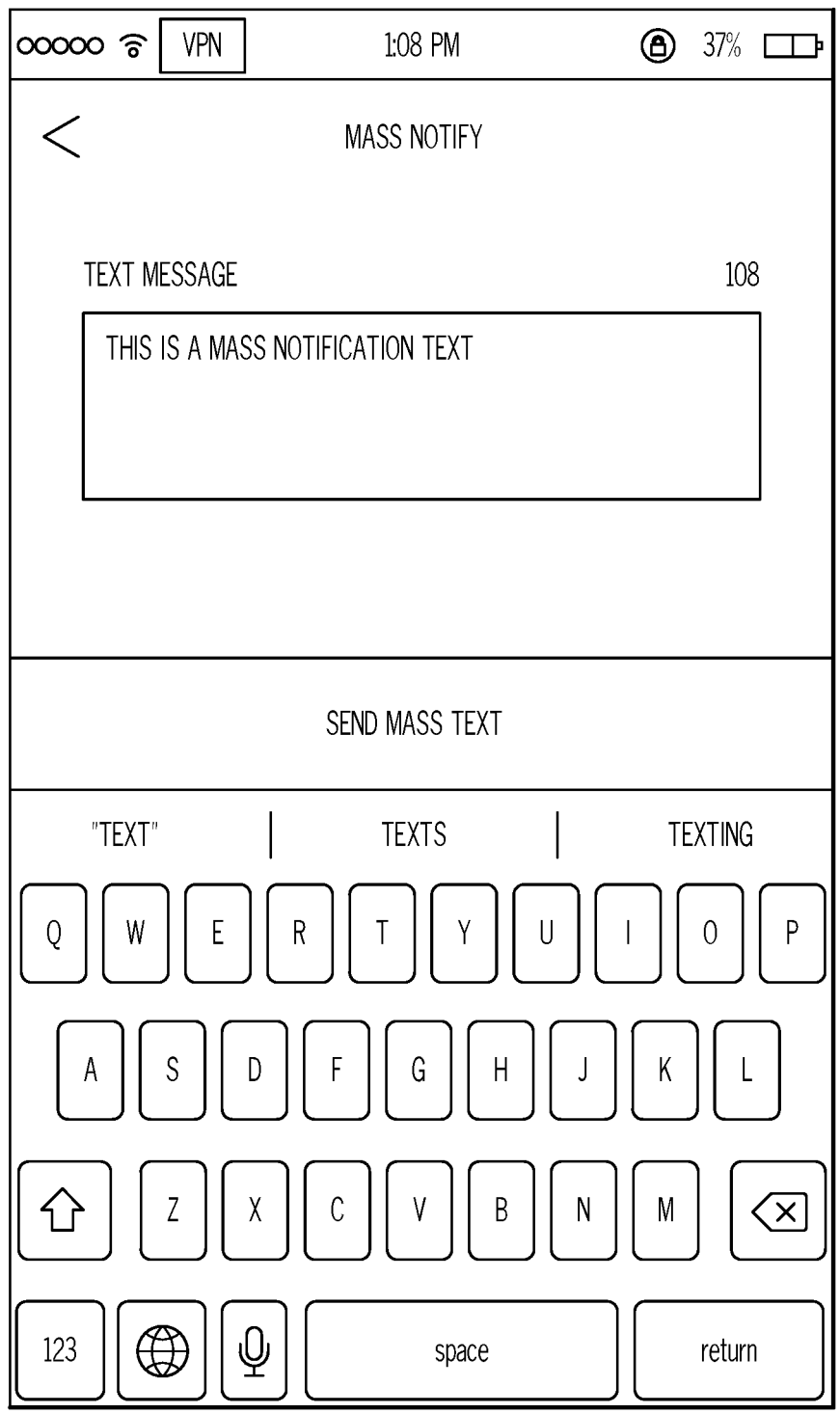
FIG. 25 is a text message screen for a mass notify of another embodiment of the active alert system.
Figure 26:
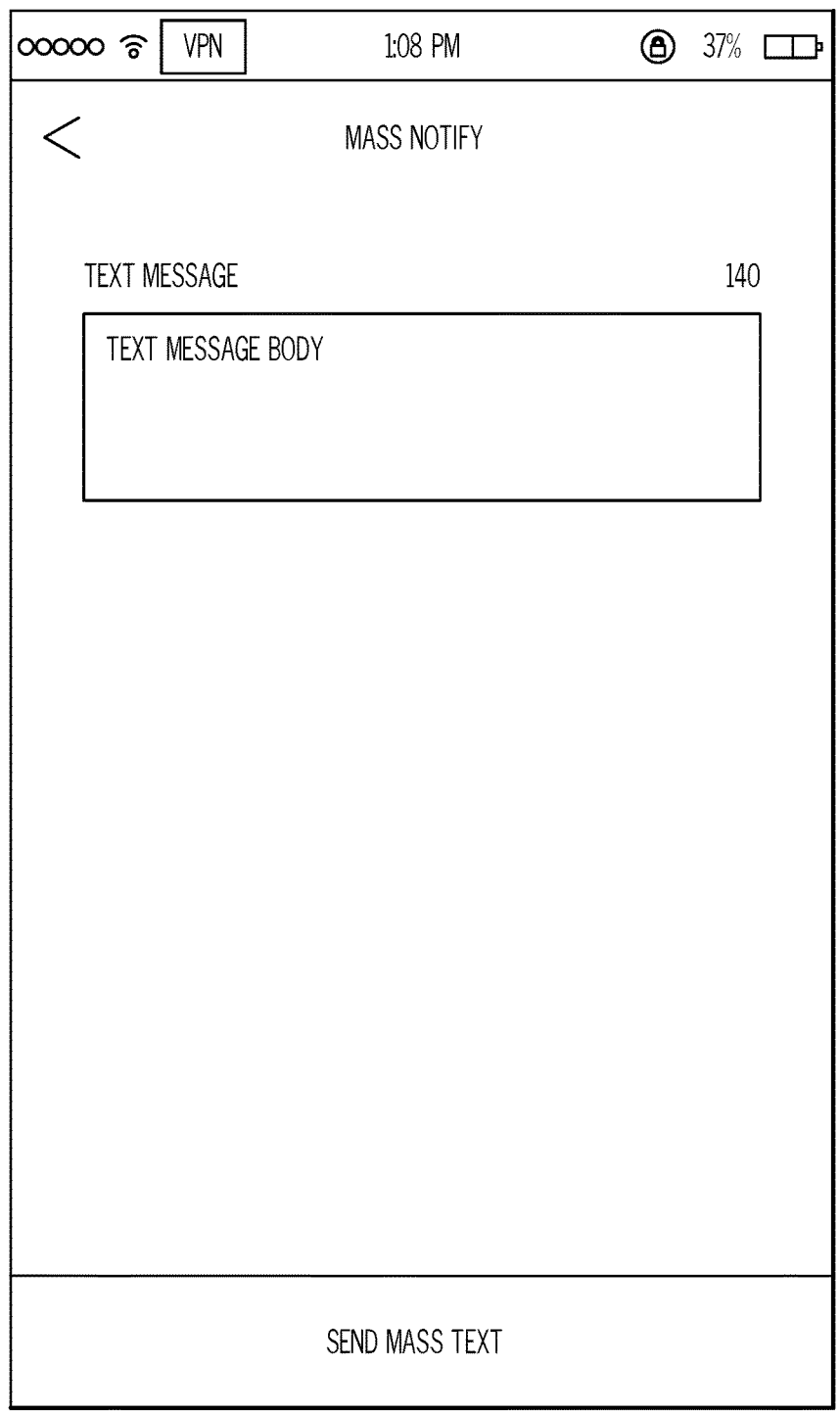
FIG. 26 is another text message screen for the mass notify of another embodiment of the active alert system.
Figure 27:
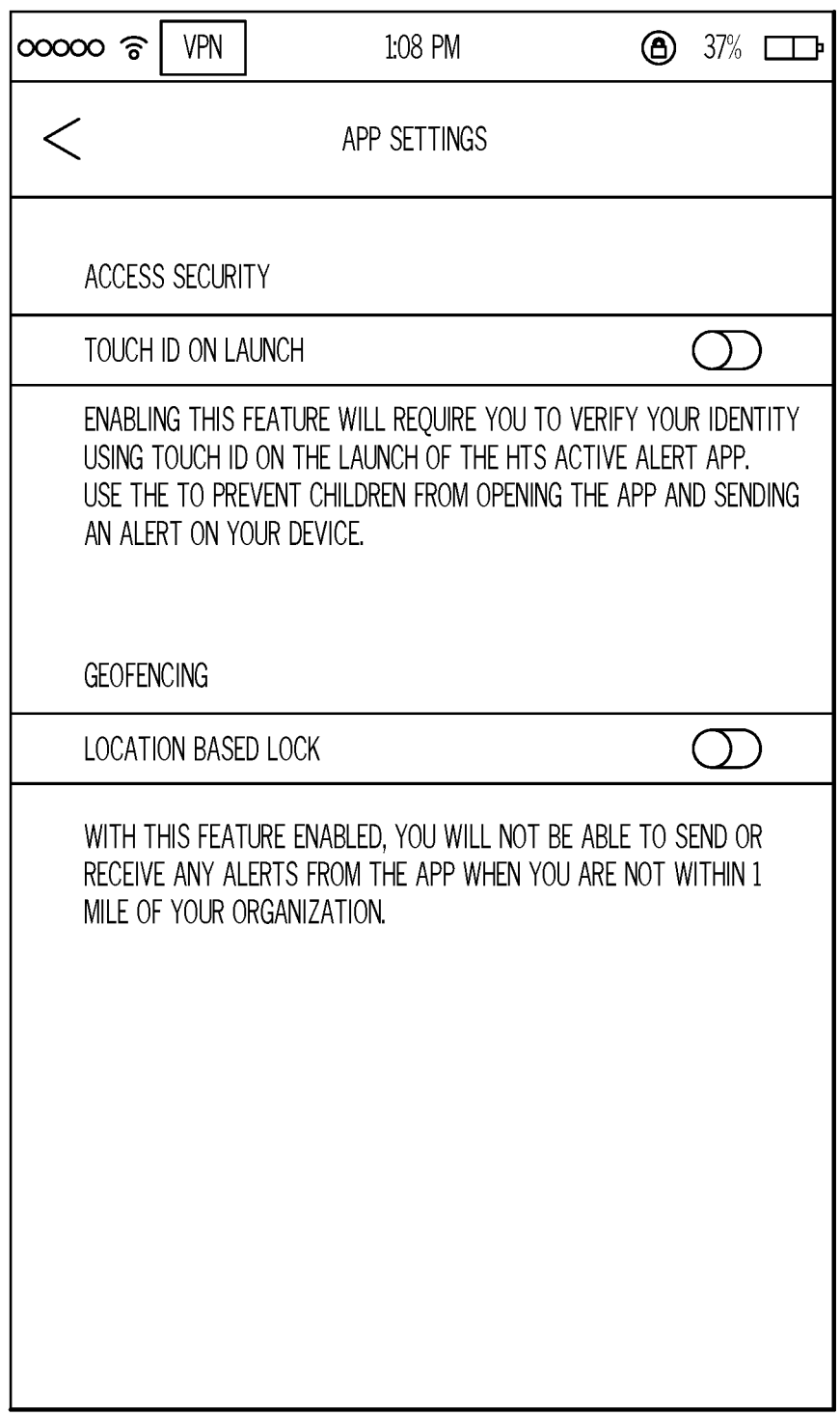
FIG. 27 is a screen of the app settings of another embodiment of the active alert system.

The app in this embodiment has also be been provided with several additional features, as shown in FIG. 24. One feature allows for custom names for each floor, so a floor can be named Basement, for example. Another feature is the ability for the Admin to send a mass notification text to ALL registered smartphones or to a subset of smartphones, such as teachers and administrators. Using the beacons, mass notifications could even be contemplated for sending to a particular floor or room in the building. The mass notification is shown in FIGS. 25 and 26. An application setting screen is also provided and shown in FIG. 27, which can prevent a child from sending an alert from a teacher or administrator phone and only permit alerts from being sent from within a certain distance from the building.

Figure 22:
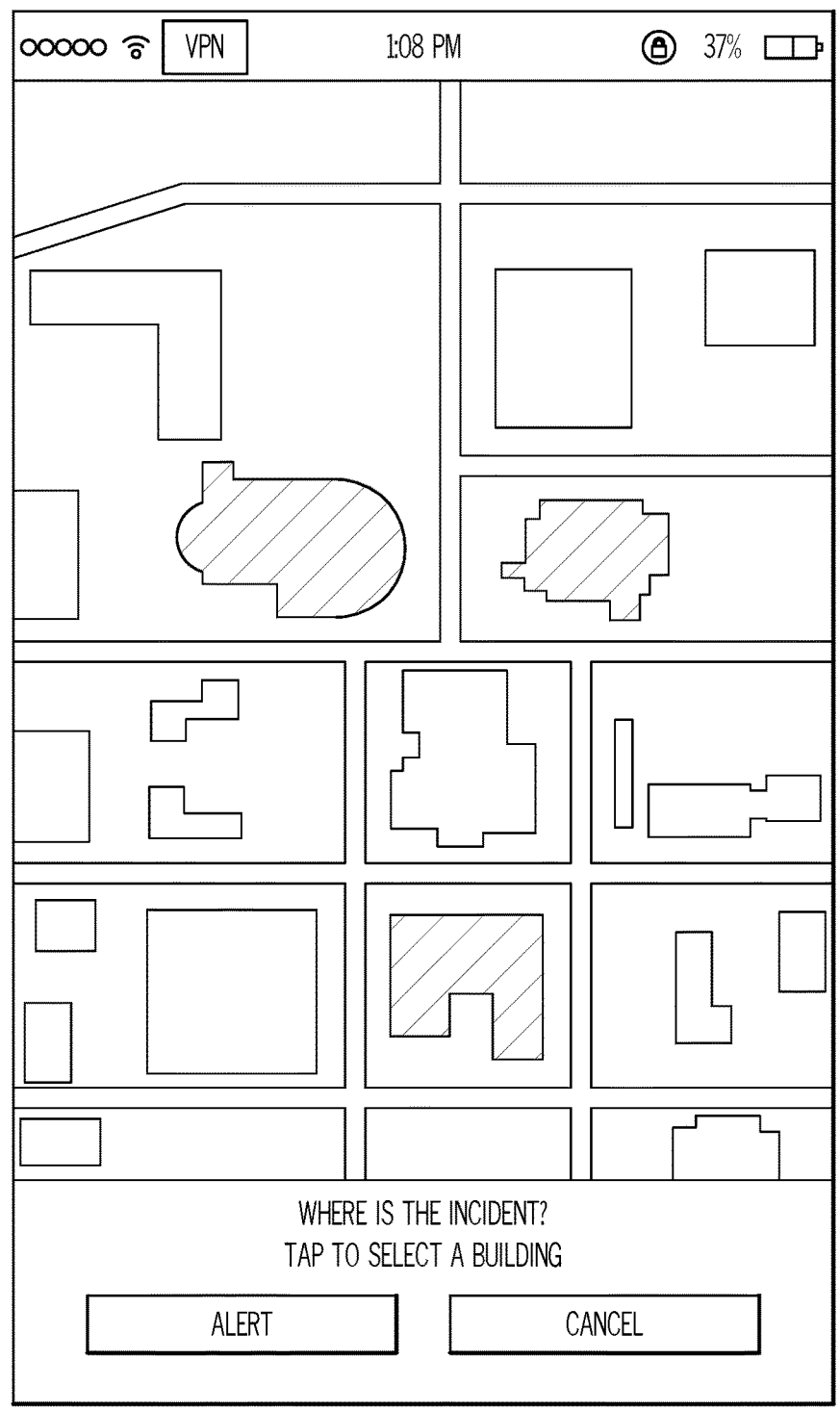
FIG. 22 is a screen shot of a campus for the campus version of the active alert system.
Figure 23:
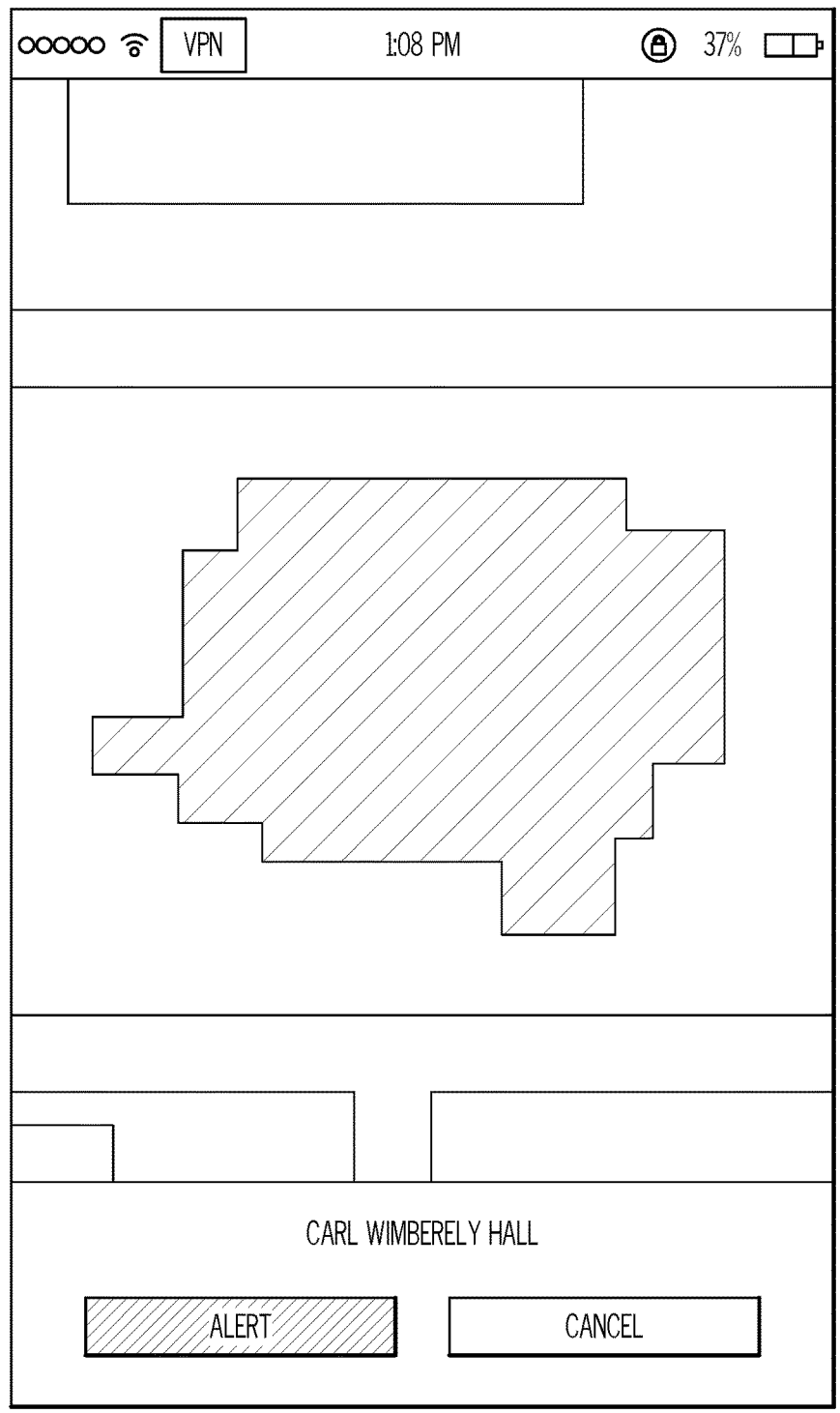
FIG. 23 is a confirmation screen of the campus building selection of FIG. 22.

A campus version of the app is shown at FIGS. 22 and 23, in which the user first selects one building of a campus with several buildings (FIG. 22) and the building is confirmed at FIG. 23. The system functions the same as discussed above in connection with FIGS. 1-20 once the alert is narrowed down to a single building on the campus. the function of sending a mass notification.

Some additional, but unclaimed subject matter follows:
2. The method of providing an active alert of claim 1 further including the steps of:
providing the first user with an screenshot showing a first floorplan of the property address, and
identifying the location of the selected threat condition by the first user pressing the location in the first floorplan on the smartphone screen, which places a visual indicator on the screen, which is transmitted to the dispatch center so that cameras located near the threat condition location may be viewed to verify the threat, and
sending the first floorplan of the property address, with the visual indicator showing the location of the threat condition to the predetermined number of smartphones associated with the property address which are inside the geofence.
3. The method of providing an active alert of claim 2 wherein a first of the plurality of buttons is associated with an alert condition which, if verified by dispatch, will notify the police and where the predetermined number of smartphones which receive the threat notification is every smartphone inside the geofence.
4. The method of providing an active alert of claim 2 wherein a second of the plurality of buttons is associated with a medical condition which, if verified by dispatch, will notify 911 emergency response and where the predetermined number of smartphones which receive the threat notification is every smartphone inside the geofence associated with a medical condition.
5. The method of providing an active alert of claim 2 wherein a third of the plurality of buttons is associated with a needs assistance condition which, if verified by dispatch, will send the threat notification the predetermined number of smartphones inside the geofence associated with a needs assistance condition.
6. The method of providing an active alert of claim 2 further including the steps of:
tracking the threat location at the dispatch center using the cameras at the property address and updating the first floorplan with the current location of the threat and transmitting the updated floorplan to every smartphone associated with the property address which are inside the geofence.
7. The method of providing an active alert of claim 1 wherein the property address is a multistory building, and the database has a floorplan associated with each floor of the building and wherein the floor of the threat condition is indicated to the dispatch center.
8. The method of providing an active alert of claim 7 wherein the floor of the threat condition is indicated by the first user pressing a button associated with the floor.
9. The method of providing an active alert of claim 7 wherein the floor of the threat condition is indicated by the GPS coordinates of the first user's smartphone.
10. The method of providing an active alert of claim 7 wherein the floor of the threat condition is indicated by the first user's smartphone being registered by a plurality of location devices associated with each elevator and stairwell of each floor of the multistory building.
8. The method of providing an active alert of claim 3 wherein the database has stored mobile phone numbers of police and emergency personnel associated with the property address and dispatch can feed selected camera feeds to police and emergency personnel mobile phones.

9. The method of providing an active alert of claim 3 wherein the first button is red.

10. The method of providing an active alert of claim 4 wherein the second button is blue.

11. The method of providing an active alert of claim 5 wherein the third button is yellow.

12. The method of providing an active alert of claim 1 wherein the property location is a single story building.

13. The method of providing an active alert of claim 1 wherein the property location is a multi-story building and/or all facilities located at the property address.

14. The method of providing an active alert of claim 1 wherein the property location is single story residential home.

15. The method of providing an active alert of claim 1 wherein the property location is a multi-story residential home.

16. The method of providing an active alert of claim 1 wherein the dispatch center can send out a dismiss threat notification to all the smartphones notified of the threat condition.

17. The method of providing an active alert of claim 1 wherein the geofence is a radius a predetermined distance around the property address.

18. The method of providing an active alert of claim 1 wherein the geofence is around the perimeter of the property address.

13. The active alert system of claim 4 wherein the first button is red.

14. The active alert system of claim 5 wherein the second button is blue.

15. The active alert system of claim 6 wherein the third button is yellow.

It should be understood that although the application is described in connection with sending alert notifications to smartphones, that the alerts could be directed in addition to any computer address listed in the database. For example, the Alert could go to a desktop in the building, a laptop or even a Smart Board in a classroom. So it should be understood that the database can store mobile phone numbers and IP addresses as well.

It should also be understood that although the geofence is described as being around a building, it is possible that the geofence could be around an entire property perimeter. So if a school, for example, has a football field, or baseball field on its premises, the geofence can encompass these other facilities and the map stored could show them, so the location of the alert could be expanded to include all facilities located at the property address.

It should also be understood that the property address can refer to a single building located at an address, or to all the facilities located at an address. For example, a school can include one or more buildings, a football field, and a baseball field, all at the same address. In addition, a campus situation could include multiple buildings, each with its own address, each building could have its own set of floorplans and its own geofence, as well as having a geofence around the entire campus perimeter.

An alternative embodiment of the invention also includes installing the application on a desktop computer in a customer building, such as the reception desk, which is also equipped with a microphone. The application monitors the microphone for very load sounds, such as a gunshot, and if detected notifies the dispatch center. Using the cameras, as described above, dispatch verifies whether a threat exists and if so, sends out the threat notification to all the mobile phones and IP addresses in the database, which are inside the geofence, as well as calling first responders.

What is claimed is:

1. A method of providing an active alert for use in the event of an emergency, comprising the steps of:
   providing a database with a plurality of mobile phone numbers associated with a property address;
   providing a server associated with the database;
   the database further storing a geofence associated with the property address;
   the database further storing urls and location information with a plurality of cameras associated with the property address;
   each mobile phone number associated with a mobile phone, the mobile phone being a smartphone with global positioning system and wireless communications;
   providing an active alert app which is installed on the plurality of smartphones, the active alert application having a plurality of buttons, each button associated with a different threat condition, which when pressed by a first user is operatively connected to a dispatch center, the dispatch center accessing the database and the plurality of cameras associated with the property address to assess the selected threat condition, and upon verification sending a threat notification to a predetermined number of smartphones associated with the property address, which are inside the geofence.

2. An active alert system for use in the event of an emergency, comprising:
   a database with a plurality of mobile phone numbers associated with a property address;
   a server associated with the database;
   the database further storing a geofence associated with the property address;
   the database further storing urls and location information with a plurality of cameras associated with the property address;
   each mobile phone number associated with a mobile phone, the mobile phone being a smartphone with global positioning system and wireless communications;
   an active alert app which is installed on the plurality of smartphones, the active alert application having a plurality of buttons, each button associated with a different threat condition, which when pressed by a first user is operatively connected to a dispatch center, the dispatch center accessing the database and the plurality of cameras associated with the property address to assess the selected threat condition, and upon verification sending a threat notification to a predetermined number of smartphones associated with the property address, which are inside the geofence.

3. The active alert system of claim 2 further including:
   providing the first user with an screenshot showing a first floorplan of the property address, and
   identifying the location of the selected threat condition by the first user pressing the location in the first floorplan on the smartphone screen, which places a visual indicator on the screen, which is transmitted to the dispatch center so that cameras located near the threat condition location may be viewed to verify the threat, and
   sending the first floorplan of the property address, with the visual indicator showing the location of the threat condition to the predetermined number of smartphones associated with the property address which are inside the geofence.

4. The active alert system of claim 3 wherein a first of the plurality of buttons is associated with an alert condition which, will notify the police and where the predetermined number of smartphones which receive the threat notification is every smartphone inside the geofence.

5. The active alert system of claim 3 wherein a second of the plurality of buttons is associated with a medical condition which, will notify 911 emergency response and where the predetermined number of smartphones which receive the threat notification is every smartphone inside the geofence associated with a medical condition.

6. The active alert system of claim 3 wherein a third of the plurality of buttons is associated with a needs assistance condition which, will send the threat notification the predetermined number of smartphones inside the geofence associated with a needs assistance condition.

7. The active alert system of claim 3 further including the steps of:
tracking the threat location at the dispatch center using the cameras at the property address and updating the first floorplan with the current location of the threat and transmitting the updated floorplan to every smartphone associated with the property address which are inside the geofence.

8. The active alert system of claim 2 wherein the property address is a multistory building, and the database has a floorplan associated with each floor of the building and wherein the floor of the threat condition is indicated to the dispatch center.

9. The active alert system of claim 8 wherein the floor of the threat condition is indicated by the first user pressing a button associated with the floor.

10. The active alert system of claim 8 wherein the floor of the threat condition is indicated by the global positioning system coordinates of the first user's smartphone.

11. The active alert system of claim 8 wherein the floor of the threat condition is indicated by the first user's smartphone being registered by a plurality of location devices associated with each elevator and stairwell of each floor of the multistory building.

12. The active alert system of claim 4 wherein the database has stored mobile phone numbers of police and emergency personnel associated with the property address and dispatch can feed selected camera feeds to police and emergency personnel mobile phones.

13. The active alert system of claim 2 wherein the property location is a single story building.

14. The active alert system of claim 2 wherein the property location is a multi-story building.

15. The active alert system of claim 2 wherein the property location is a single story or a multi-story residential home.

16. The active alert system of claim 2 wherein the dispatch center can send out a dismiss threat notification to all the smartphones notified of the threat condition.

17. The active alert system of claim 2 wherein the geofence is a radius a predetermined distance around the property address.

18. The active alert system of claim 2 wherein the geofence is around the perimeter of the property address.

19. The active alert system of claim 2 further including a camera server connected to a video transmitter which is connected to all the internet protocol cameras in a building and which transmits video of all internet protocol cameras to the dispatch center.

20. The active alert system of claim 2 further including a plurality of beacons to permit the tracking of smartphones between floors and rooms of a building.

21. The active alert system of claim 2 wherein the active alert app is configured to allow sending a mass notification to a predetermined number of the smartphones.

22. The active alert system of claim 21 wherein the predetermined number is all administrator and teacher smartphones.

23. The active alert system of claim 21 wherein the predetermined number is all smartphones.

24. The active alert system of claim 21 wherein the predetermined number is all smartphones which are within a predetermined room.

25. The active alert system of claim 2 further including the feature of sending live video from dispatch to at least one first responder smartphones.

26. The active alert system of claim 2 wherein each camera includes a microphone which can be configured to detect a shot noise.

27. The active alert system of claim 26 wherein each camera includes a heat sensor.

28. The active alert system of claim 27 wherein each camera includes a smoke detector.

29. A method of providing an active alert for use in the event of an emergency, comprising the steps of:
providing a database with a plurality of mobile phone numbers or internet protocol addresses associated with a property address;
providing a server associated with the database;
the database further storing a geofence associated with the property address;
providing at least one microphone associated with the property address;
each mobile phone number associated with a mobile phone, the mobile phone being a smartphone with global positioning system and wireless communications;
providing an active alert app which is installed on a computer electrically connected to the microphone, the active alert application monitoring for load sounds such as a gunshot and if such as load sound is detected sending a notification to a dispatch center, the dispatch center accessing the database and a plurality of cameras associated with the property address to assess whether a threat condition exists, and upon verification sending a threat notification to a predetermined number of smartphones associated with the property address, which are inside the geofence.

* * * * *